(12) United States Patent
Shiratsuchi et al.

(10) Patent No.: US 10,846,846 B2
(45) Date of Patent: Nov. 24, 2020

(54) PATTERN INSPECTION APPARATUS AND PATTERN INSPECTION METHOD

(71) Applicant: NuFlare Technology, Inc., Yokohama (JP)

(72) Inventors: Masataka Shiratsuchi, Kawasaki (JP); Riki Ogawa, Kawasaki (JP); Hideaki Hashimoto, Yokohama (JP); Kazuhiro Nakashima, Kawasaki (JP); Ryoichi Hirano, Setagaya-ku (JP); Hideo Tsuchiya, Setagaya-ku (JP); Chosaku Noda, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 107 days.

(21) Appl. No.: 16/104,191

(22) Filed: Aug. 17, 2018

(65) Prior Publication Data

US 2019/0066286 A1 Feb. 28, 2019

(30) Foreign Application Priority Data

Aug. 25, 2017 (JP) .................................. 2017-162076

(51) Int. Cl.
*G06T 3/40* (2006.01)
*G06T 5/00* (2006.01)
(Continued)

(52) U.S. Cl.
CPC ............ *G06T 7/001* (2013.01); *G06T 3/4053* (2013.01); *G06T 5/002* (2013.01); *G06T 7/32* (2017.01);
(Continued)

(58) Field of Classification Search
None
See application file for complete search history.

(56) References Cited

U.S. PATENT DOCUMENTS 5,430,811 A 7/1995 Fukushima et al.
6,169,282 B1* 1/2001 Maeda ................. G01R 31/311
250/307
(Continued)

FOREIGN PATENT DOCUMENTS

JP 05-284338 10/1993
JP 3161849 4/2001
(Continued)

*Primary Examiner* — Soo Shin
(74) *Attorney, Agent, or Firm* — Oblon, McClelland, Maier & Neustadt, L.L.P.

(57) ABSTRACT

According to one aspect of the present invention, a pattern inspection apparatus includes: a first sub-pixel interpolation processing circuitry configured to calculate a pixel value of a reference image corresponding to a position of each pixel of the inspection target image by performing an interpolation process using at least one pixel value of the reference image for each shift amount while variably and relatively shifting the inspection target image and the reference image by the unit of a sub-pixel using the reference image corresponding to the inspection target image; and an SSD calculation processing circuitry configured to calculate a sum of squared difference between each pixel value of the inspection target image and a corresponding pixel value of the reference image subjected to a filter process for the each shift amount.

12 Claims, 14 Drawing Sheets

(51) Int. Cl.
  *G06T 7/00* (2017.01)
  *G06T 7/32* (2017.01)
(52) U.S. Cl.
  CPC ............... *G06T 2207/10061* (2013.01); *G06T 2207/20016* (2013.01); *G06T 2207/20021* (2013.01); *G06T 2207/20024* (2013.01); *G06T 2207/30148* (2013.01)

(56) References Cited

U.S. PATENT DOCUMENTS

| | | | |
|---|---|---|---|
| 6,947,587 B1* | 9/2005 | Maeda | G01N 21/95607 382/144 |
| 9,124,902 B2 | 9/2015 | Alshin et al. | |
| 2006/0233434 A1* | 10/2006 | Hamamatsu | G06K 9/38 382/149 |
| 2007/0064995 A1* | 3/2007 | Oaki | G03F 1/84 382/144 |
| 2016/0070971 A1* | 3/2016 | Nakashima | G06T 7/001 348/87 |

FOREIGN PATENT DOCUMENTS

| | | |
|---|---|---|
| JP | 2012-002674 | 1/2012 |
| JP | 2013-542666 | 11/2013 |
| JP | 5654685 | 1/2015 |

* cited by examiner $$\begin{cases} g_x = q_{-1}g_{-1} + q_0 g_0 + q_1 g_1 + q_2 g_2 \\ q_{-1} + q_0 + q_1 + q_2 = 1 \\ q_{-1}^2 + q_0^2 + q_1^2 + q_2^2 = f(x) \end{cases}$$

$$\begin{cases} g' = c_1 g_{-1} + c_0 g_0 + c_1 g_1 \\ c_0 + 2c_1 = 1 \\ c_0^2 + 2c_1^2 = \dfrac{f(x')}{f(x)} \end{cases}$$

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2017-162076 filed on Aug. 25, 2017 in Japan, the entire contents of which are incorporated herein by reference.

BACKGROUND OF THE INVENTION

Field of the Invention

The present invention relates to a pattern inspection apparatus and a pattern inspection method. For example, the invention relates to a method of aligning an image of a figure formed on a substrate captured for inspection using an electron beam.

Related Art

In recent years, a circuitry line width required for semiconductor elements has been getting narrower along with higher integration and larger capacity of large scale integrated circuits (LSI). These semiconductor elements are manufactured by forming a circuitry on a wafer in such a manner that a pattern is exposed and transferred onto the wafer by a reduced projection exposure apparatus called a stepper using an original image pattern (which is a mask or reticle and will be hereinafter referred to as a mask) on which a circuitry pattern is formed.

Then, improvement in yield is necessary for manufacturing LSIs that require a large manufacturing cost. However, as represented by a one gigabit-class DRAM (random access memory), the pattern constituting the LSI is on the order of submicron to nanometer. In recent years, the dimension to be detected as a pattern defect becomes extremely small in accordance with the miniaturization of the LSI pattern size formed on a semiconductor wafer. Therefore, it is necessary to improve the accuracy of the pattern inspection apparatus for inspecting defects of an ultrafine pattern transferred onto the semiconductor wafer. In addition, as one of the major factors for lowering the yield, a pattern defect of a mask used for exposing and transferring an ultrafine pattern onto the semiconductor wafer by a photolithography technique can be exemplified. For that reason, it is necessary to improve the accuracy of the pattern inspection apparatus for inspecting a defect of a transfer mask used for LSI manufacture.

As an inspection method, there is known a method of performing an inspection by comparing a measurement image obtained by capturing a pattern formed on a substrate such as a semiconductor wafer or a lithography mask with design data or a measurement image obtained by capturing the same pattern on the substrate. For example, as the pattern inspection method, there is known a "die to die inspection" of comparing the measurement image data obtained by capturing the same pattern at a different position on the same substrate or a "die to database inspection" of generating design image data (reference image) based on design data for designing a pattern and comparing the design image data with a measurement image which is measurement data obtained by capturing the pattern. In an inspection method of such an inspection apparatus, an inspection target substrate is placed on a stage and the stage moves so that a beam scans a target object for an inspection. A beam is irradiated to the inspection target substrate by a light source and an illumination optical system. Light which is transmitted through or is reflected by the inspection target substrate is imaged on a sensor via the optical system. An image captured by the sensor is transmitted as measurement data to a comparison circuitry. In the comparison circuitry, the measurement data is compared with reference data according to an appropriate algorithm after the images are aligned to each other. When the measurement data and the reference data are not the same, it is determined that a pattern defect exists.

As a method of aligning the images to each other, an SSD (Sum of Squared Difference) method is used. In the SSD method, one of the images to be compared is shifted by the unit of a sub-pixel, a pixel value for a positional deviation smaller than one pixel after the shifting is obtained by an interpolation and is aligned to a position in which the sum of squared difference of the pixel values of both images is minimized (for example, see JP-A-2012-002674).

In the above-described pattern inspection apparatus, an optical image is acquired by irradiating a laser beam to an inspection target substrate and capturing a transmitted image or a reflected image. In contrast, an inspection apparatus is also developed which irradiates multiple beams using an electron beam to an inspection target substrate, detects secondary electrons corresponding to the beams emitted from the inspection target substrate, and acquires a pattern image. Here, in a case of capturing an image by using the electron beam, it is proved that the images cannot be sufficiently aligned to each other in the known SSD method. Specifically, when one of the images to be compared with each other is shifted by the unit of a sub-pixel, there is a case in which a positional deviation smaller than one pixel is erroneously determined that a shift position of 1/2 pixels is optimal. In the electron beam inspection apparatus, since the number of electrons incident per unit region is limited, there is a large influence of the shot noise for each electron. For that reason, it is considered that the noise reduction effect is maximized at a position of 1/2 pixels at which the noise component of the interpolated value of the pixel after the shifting is most averaged with respect to the positional deviation smaller than one pixel rather than the positional relationship between the patterns.

A method of increasing the number of electrons incident per unit area by increasing the dose of the electron beam to solve such a problem is difficult to be adopted because the throughput is deteriorated. Also, since it is difficult to eliminate the presence of the shot noise itself, there is a problem that a highly accurate alignment is not easily performed.

BRIEF SUMMARY OF THE INVENTION

According to one aspect of the present invention, a pattern inspection apparatus includes:

an image acquiring mechanism configured to acquire an inspection target image for a figure from a substrate provided with the figure by using an electron beam;

a first sub-pixel interpolation processing circuitry configured to calculate a pixel value of a reference image corresponding to a position of each pixel of the inspection target image by performing an interpolation process using at least one pixel value of the reference image for each shift amount while variably and relatively shifting the inspection target image and the reference image by the unit of a sub-pixel using the reference image corresponding to the inspection target image;

a filter processing circuitry configured to perform a filter process on the pixel value of the reference image subjected to the interpolation process by using a filter function of suppressing an influence of noise depending on a shift amount, for the each shift amount;

an SSD calculation processing circuitry configured to calculate a sum of squared difference between each pixel value of the inspection target image and a corresponding pixel value of the reference image subjected to the filter process for the each shift amount; and a comparison processing circuitry configured to compare the inspection target image with the reference image while the inspection target image is aligned to the reference image by using a shift amount in which the calculated sum of squared difference is minimized.

According to another aspect of the present invention, a pattern inspection apparatus includes:

an image acquiring mechanism configured to acquire an inspection target image of a figure from a substrate provided with the figure by using an electron beam;

a first storage device configured to store the inspection target image;

a second storage device configured to store a reference image corresponding to the inspection target image;

a first smoothing processing circuitry configured to perform a first smoothing process of smoothing a pattern end on the figure in the inspection target image;

a second smoothing processing circuitry configured to perform a second smoothing process of smoothing a pattern end on the figure in the reference image;

a first sub-pixel interpolation processing circuitry configured to calculate a pixel value of the reference image corresponding to a position of each pixel of the inspection target image by performing an interpolation process using at least one pixel value of the reference image subjected to the second smoothing process for each shift amount while variably and relatively shifting the inspection target image subjected to the first smoothing process and the reference image subjected to the second smoothing process by the unit of a sub-pixel;

an SSD calculation processing circuitry configured to calculate a sum of squared difference between each pixel value of the inspection target image and a corresponding pixel value of the reference image subjected to the interpolation process for the each shift amount;

a second sub-pixel interpolation processing circuitry configured to calculate a pixel value of the reference image corresponding to a position of each pixel of the inspection target image by reading the reference image not subjected to the second smoothing process from the second storage device and performing an interpolation process with a shift amount in which the sum of squared difference is minimized using at least one pixel value of the reference image not subjected to the second smoothing process; and a comparison processing circuitry configured to compare the inspection target image with the reference image subjected to the interpolation process with the shift amount in which the sum of squared difference is minimized while the second smoothing process is performed thereon.

According to yet another aspect of the present invention, a pattern inspection method includes:

acquiring an inspection target image for a figure from a substrate provided with the figure by using an electron beam;

calculating a pixel value of a reference image corresponding to a position of each pixel of the inspection target image by performing an interpolation process using at least one pixel value of the reference image for each shift amount while variably and relatively shifting the inspection target image and the reference image by the unit of a sub-pixel using the reference image corresponding to the inspection target image;

performing a filter process on the pixel value of the reference image subjected to the interpolation process by using a filter function of suppressing an influence of noise depending on a shift amount, for the each shift amount;

calculating a sum of squared difference between each pixel value of the inspection target image and a corresponding pixel value of the reference image subjected to the filter process for the each shift amount; and comparing the inspection target image with the reference image while the inspection target image is aligned to the reference image by using a shift amount in which the calculated sum of squared difference is minimized and outputting the result.

According to yet another aspect of the present invention, a pattern inspection method includes:

acquiring an inspection target image of a figure from a substrate provided with the figure by using an electron beam;

performing a first smoothing process of smoothing a pattern end on the figure inside the inspection target image by reading the inspection target image from a first storage device storing the inspection target image;

performing a second smoothing process of smoothing a pattern end on a figure of a reference image by reading the reference image from a second storage device storing the reference image corresponding to the inspection target image;

calculating a pixel value of the reference image corresponding to a position of each pixel of the inspection target image by performing an interpolation process using at least one pixel value of the reference image subjected to the second smoothing process for each shift amount while variably and relatively shifting the reference image subjected to the second smoothing process and the inspection target image subjected to the first smoothing process by the unit of a sub-pixel for the each shift amount;

calculating a sum of squared difference between each pixel value of the inspection target image and a corresponding pixel value of the reference image subjected to the interpolation process for the each shift amount;

calculating a pixel value of the reference image corresponding to a position of each pixel of the inspection target image by reading the reference image not subjected to the second smoothing process from the second storage device and performing an interpolation process with a shift amount in which the sum of squared difference is minimized using at least one pixel value of the reference image not subjected to the second smoothing process; and comparing the inspection target image with the reference image subjected to the interpolation process with the shift amount in which the sum of squared difference is minimized while the second smoothing process is performed thereon and outputting the result.

DETAILED DESCRIPTION OF THE INVENTION

In the following embodiments, an inspection apparatus and method capable of aligning images with reduced influence of noise will be described.

Further, in the following embodiments, as an example of a method of capturing a pattern formed on an inspection target substrate (acquiring an inspection target image), a method of capturing a secondary electron image by irradiating multiple beams to the inspection target substrate using electron beams will be described. However, the invention is not limited thereto. As a method of capturing the pattern formed on the inspection target substrate, for example, a method of capturing a secondary electron image (acquiring an inspection target image) by irradiating a single beam to the inspection target substrate using one electron beam may be also used.

Embodiment 1

Figure 1:
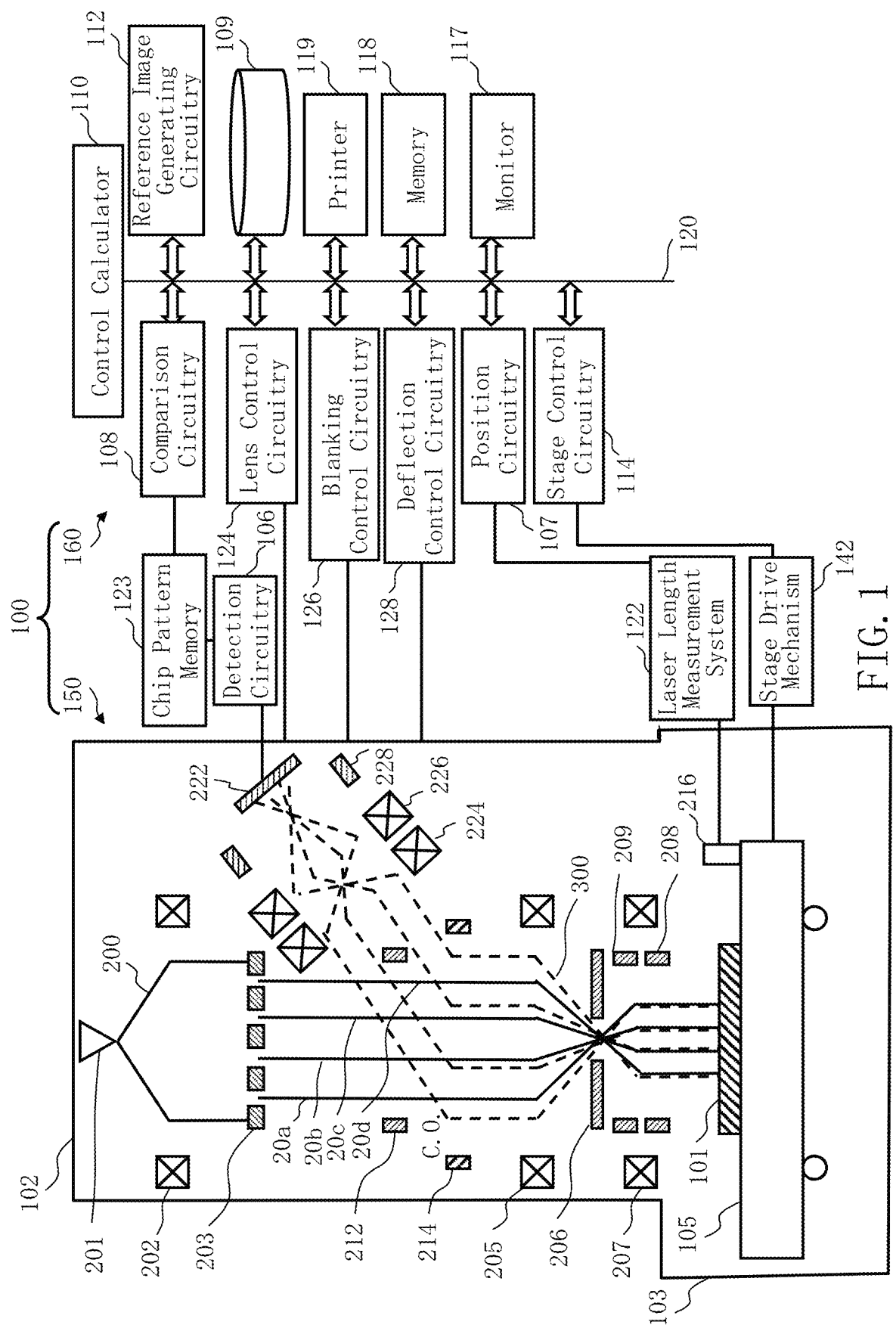
FIG. 1 is a configuration diagram illustrating a configuration of a pattern inspection apparatus of Embodiment 1.

FIG. 1 is a configuration diagram illustrating a configuration of a pattern inspection apparatus of Embodiment 1. In FIG. 1, an inspection apparatus 100 for inspecting a pattern formed on a substrate is an example of an electron beam inspection apparatus. The inspection apparatus 100 includes an image acquiring mechanism 150 and a control system circuitry 160 (a control unit). The image acquiring mechanism 150 includes an electron beam column 102 (electron optical column), an inspection room 103, a detection circuitry 106, a chip pattern memory 123, a stage drive mechanism 142, and a laser length measurement system 122. An electron gun assembly 201, an illumination lens 202, a shaping aperture array substrate 203, a reduction lens 205, a limiting aperture substrate 206, an objective lens 207, a main deflector 208, a sub-deflector 209, a collective blanking deflector 212, a beam separator 214, projection lenses 224 and 226, a deflector 228, and a multi-detector 222 are disposed inside the electron beam column 102.

An XY stage 105 which is movable on at least the XY plane is disposed inside the inspection room 103. A substrate 101 which is an inspection object is disposed on the XY stage 105. The substrate 101 includes an exposure mask substrate and a semiconductor substrate such as a silicon wafer. When the substrate 101 is the semiconductor substrate, the semiconductor substrate is provided with a plurality of chip patterns (wafer dies). When the substrate 101 is the exposure mask substrate, the exposure mask substrate is provided with a chip pattern. The chip pattern is formed by a plurality of figures. When the chip pattern formed on such an exposure mask substrate is exposed and transferred onto the semiconductor substrate a plurality of times, a plurality of chip patterns (wafer dies) are formed on the semiconductor substrate. Hereinafter, a case in which the substrate 101 is the semiconductor substrate will be chiefly described. For example, the substrate 101 is disposed on the XY stage 105 so that a pattern formation surface faces upward. Further, a mirror 216 which reflects a laser beam for a laser length measurement irradiated from the laser length measurement system 122 disposed outside the inspection room 103 is disposed on the XY stage 105. The multi-detector 222 is connected to the detection circuitry 106 at the outside of the electron beam column 102. The detection circuitry 106 is connected to the chip pattern memory 123.

In the control system circuitry 160, a control calculator 110 which controls the entire inspection apparatus 100 is connected to a position circuitry 107, a comparison circuitry 108, a reference image generating circuitry 112, a stage control circuitry 114, a lens control circuitry 124, a blanking control circuitry 126, a deflection control circuitry 128, a storage device 109 such as a magnetic disk drive, a monitor 117, a memory 118, and a printer 119 via a bus 120.

Further, the chip pattern memory 123 is connected to the comparison circuitry 108. Further, the XY stage 105 is driven by the drive mechanism 142 under the control of the stage control circuitry 114. In the drive mechanism 142, for example, a drive system such as a three-axis (X-Y-θ) motor driven in the directions X, Y, and θ is configure so that the XY stage 105 is movable. These X, Y, and θ-axis motors (not illustrated) can be configure as, for example, stepping motors. The XY stage 105 is movable in the horizontal direction and the rotation direction by the X, Y, and θ-axis motors. Then, the movement position of the XY stage 105 is measured by the laser length measurement system 122 and is supplied to the position circuitry 107. The laser length measurement system 122 measures the length of the position of the XY stage 105 by the principle of the laser interference method by receiving the reflected light from the mirror 216.

A high-voltage power supply circuitry (not illustrated) is connected to the electron gun assembly 201. An acceleration voltage generated from a high-voltage power supply circuitry is applied between a filament (not illustrated) and a drawn electrode in the electron gun assembly 201. At the same time, a voltage is applied to a predetermined drawn electrode (Wehnelt) and a cathode is heated to a predetermined temperature, so that an electron group emitted from the cathode is accelerated and is emitted as the electron beam 200. The illumination lens 202, the reduction lens 205, the objective lens 207, and the projection lenses 224 and 226 are configure as, for example, electronic lenses and all of them are controlled by the lens control circuitry 124. Further, the beam separator 214 is also controlled by the lens control circuitry 124. Each of the collective blanking deflector 212 and the deflector 228 is configure as at least a two-pole electrode group and is controlled by the blanking control circuitry 126. Each of the main deflector 208 and the sub-deflector 209 is configure as at least a four-pole electrode group and is controlled by the deflection control circuitry 128.

Here, only a configuration necessary for describing Embodiment 1 is described in FIG. 1. In general, other necessary configurations may be provided in the inspection apparatus 100.

Figure 2:
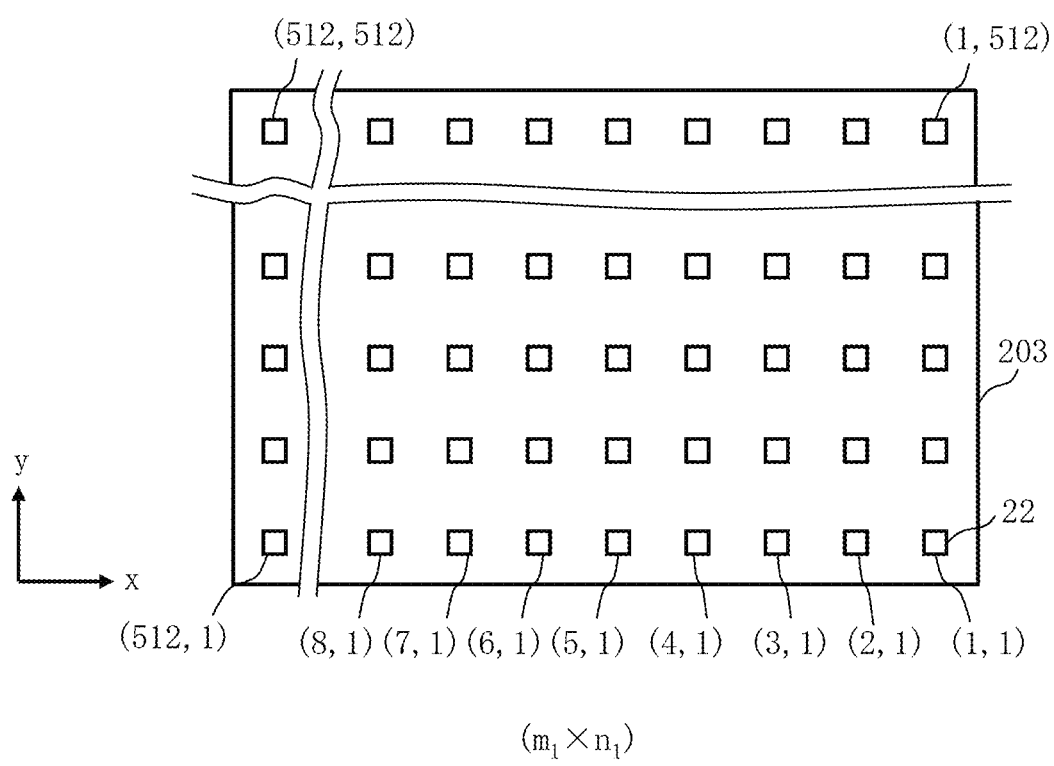
FIG. 2 is a conceptual diagram illustrating a configuration of a shaping aperture array substrate of Embodiment 1.

FIG. 2 is a conceptual diagram illustrating a configuration of the shaping aperture array substrate of Embodiment 1. In FIG. 2, the shaping aperture array substrate 203 is provided with a plurality of two-dimensional shaped holes (opening portions) 22 of $m_1$ row in the width direction (the x direction)×$n_1$ step in the length direction (the y direction) ($m_1$ and $n_1$ are integers of 2 or more) which are formed according to a predetermined arrangement pitch in the x and y directions. In the example of FIG. 2, a case in which 512×512 holes (opening portions) 22 are formed is illustrated. All of the holes 22 are formed in a rectangular shape to have the same dimension. Alternatively, the holes may be formed in a circular shape to have the same outer diameter. When a part of the electron beam 200 passes through these holes 22, multiple beams 20 are formed. Here, an example in which two rows or more of holes 22 are arranged in the width and length directions (the x and y directions) are illustrated, but the invention is not limited thereto. For example, a plurality of rows of holes may be formed in one of the width and length directions (the x and y directions) and only one row of holes may be formed in the other thereof. Further, a method of arranging the holes 22 is not limited to a case in which the holes are arranged in a lattice shape in the width and length directions as illustrated in FIG. 2. For example, the hole of the k-th row and the hole of the k+1-th row in the length direction (the y direction) may be shifted from each other by a dimension a in the width direction (the x direction). Similarly, the hole of the k+1-th row and the hole in the k+2-th row in the length direction (the y direction) may be disposed to be shifted from each other by a dimension b in the width direction (the x direction).

The image acquiring mechanism 150 acquires an inspection target image of a figure from the substrate 101 provided with the figure by using multiple beams 20 according to the electron beam. Hereinafter, an operation of the image acquiring mechanism 150 of the inspection apparatus 100 will be described.

The electron beam 200 emitted from the electron gun assembly 201 (the emission source) illuminates the entire shaping aperture array substrate 203 in a substantially perpendicular direction by the illumination lens 202. As illustrated in FIG. 2, the shaping aperture array substrate 203 is provided with a plurality of rectangular holes 22 (opening portions) and the electron beam 200 illuminates a region including all of the holes 22. When a part of the electron beam 200 irradiated to the positions of the plurality of holes 22 passes through the holes 22 of such a shaping aperture array substrate 203, for example, a plurality of rectangular electron beams (multiple beams) 20a to 20d (indicated by the solid line of FIG. 1) are formed.

Then, the formed multiple beams 20a to 20d form a crossover (C.O.), pass through the beam separators 214 respectively disposed at the beam crossover positions of multiple beams 20, is reduced by the reduction lens 205, and then travels toward the center hole formed in the limiting aperture substrate 206. Here, when all of multiple beams 20a to 20d are collectively deflected by the collective blanking deflector 212 disposed between the shaping aperture array substrate 203 and the reduction lens 205, the beams are shifted from the center hole of the limiting aperture substrate 206 to be shielded by the limiting aperture substrate 206. Meanwhile, multiple beams 20a to 20d which are not deflected by the collective blanking deflector 212 pass through the center hole of the limiting aperture substrate 206 as illustrated in FIG. 1. Blanking control is performed as such a collective blanking deflector 212 is turned on or off so that the collective beam on/off control is performed. In this way, the limiting aperture substrate 206 shields multiple beams 20a to 20d deflected so that the beam is turned off by the collective blanking deflector 212. Then, multiple beams 20a to 20d for inspection are formed by a beam group having passed through the limiting aperture substrate 206 and formed from the beam ON state to the beam OFF state. Multiple beams 20a to 20d having passed through the limiting aperture substrate 206 are focused on a surface of a target object 101 by the objective lens 207 so that a pattern image (a beam diameter) with a desired reduction ratio is formed and all of multiple beams 20 having passed through the limiting aperture substrate 206 are collectively deflected in the same direction by the main deflector 208 and the sub-deflector 209 so that each beam is irradiated to each irradiation position on the substrate 101. In such a case, all of multiple beams 20 are collectively deflected to the reference position of the mask die scanned with multiple beams 20 by the main deflector 208. When the scanning is performed while continuously moving the XY stage 105, a tracking deflection is performed to further follow the movement of the XY stage 105. Then, all of multiple beams 20 are collectively deflected so that the corresponding regions are scanned by the beams by the sub-deflector 209. Multiple beams 20 irradiated at one time are ideally arranged at a pitch obtained by multiplying the arrangement pitch of the plurality of holes 22 of the shaping aperture array substrate 203 by the above-described desired reduction ratio (1/a). In this way, the electron beam column 102 irradiates the substrate 101 with two-dimensional shaped multiple beams 20 of $m_1 \times n_1$ at one time. Due to the irradiation of multiple beams 20 to a desired position of the substrate 101, a bundle (multiple secondary electrons 300) (a dotted line of FIG. 1) of secondary electrons including reflection electrons corresponding to the beams of multiple beams 20 are emitted from the substrate 101.

Multiple secondary electrons 300 emitted from the substrate 101 are refracted to the center side of multiple secondary electrons 300 by the objective lens 207 and travel toward the center hole formed in the limiting aperture substrate 206. Multiple secondary electrons 300 having passed through the limiting aperture substrate 206 are refracted in a direction substantially square to the optical axis by the reduction lens 205 and travel to the beam separator 214.

Here, the beam separator 214 generates an electric field and a magnetic field in a direction orthogonal to each other in a surface orthogonal to the direction (the optical axis) in which multiple beams 20 travel. The electric field exerts a force in the same direction regardless of the electron travel direction. In contrast, the magnetic field exerts a force according to Fleming's left-hand rule. For that reason, it is possible to change the direction of the force applied to the electrons due to the electron entering direction. In multiple beams 20 (primary electron beams) entering the beam separator 214 from above, the forces generated by the electric field and the magnetic field cancel each other and multiple beams 20 straightly travel downward. In contrast, in multiple secondary electrons 300 entering the beam separator 214 from below, both of the forces generated by the electric field and the magnetic field are exerted in the same direction and multiple secondary electrons 300 are bent obliquely upward.

Multiple secondary electrons 300 which are bent obliquely upward are projected to the multi-detector 222 while being refracted by the projection lenses 224 and 226. The multi-detector 222 detects projected multiple secondary electrons 300. The multi-detector 222 includes a diode type two-dimensional sensor (not illustrated). Then, at the diode type two-dimensional sensor position corresponding to each beam of multiple beams 20, secondary electrons of multiple secondary electrons 300 collide with the diode type two-dimensional sensor to generate electrons and to generate secondary electron image data for each pixel to be described below. When the multi-detector 222 does not detect multiple secondary electrons 300, the deflector 228 and multiple secondary electrons 300 may be blanking-deflected so that multiple secondary electrons 300 do not reach the light receiving surface.

Figure 3:
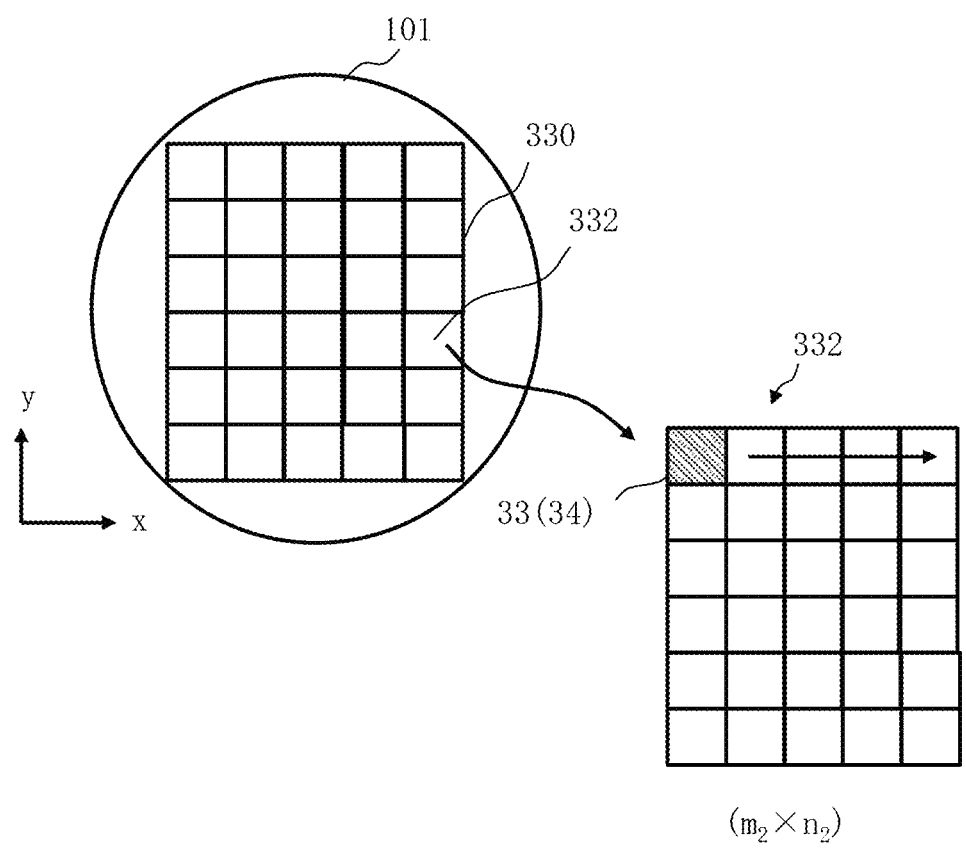
FIG. 3 is a diagram illustrating an example of a plurality of chip regions formed on a semiconductor substrate of Embodiment 1.

FIG. 3 is a diagram illustrating an example of a plurality of chip regions formed on the semiconductor substrate of Embodiment 1. In FIG. 3, a plurality of chips (wafer dies) 332 are formed in a two-dimensional array shape in the inspection region 330 of the semiconductor substrate (the wafer) 101. A mask pattern for one chip formed on the exposure mask substrate is reduced to, for example, 1/4 and is transferred to each chip 332 by an exposure device (a stepper) (not illustrated). The inside of each chip 332 is divided into, for example, a plurality of two-dimensional shaped mask dies 33 in $m_2$ rows in the width direction (the x direction)×$n_2$ steps in the length direction (the y direction) ($m_2$ and $n_2$ are integers of 2 or more). In Embodiment 1, such a mask die 33 corresponds to the unit inspection region.

Figure 4:
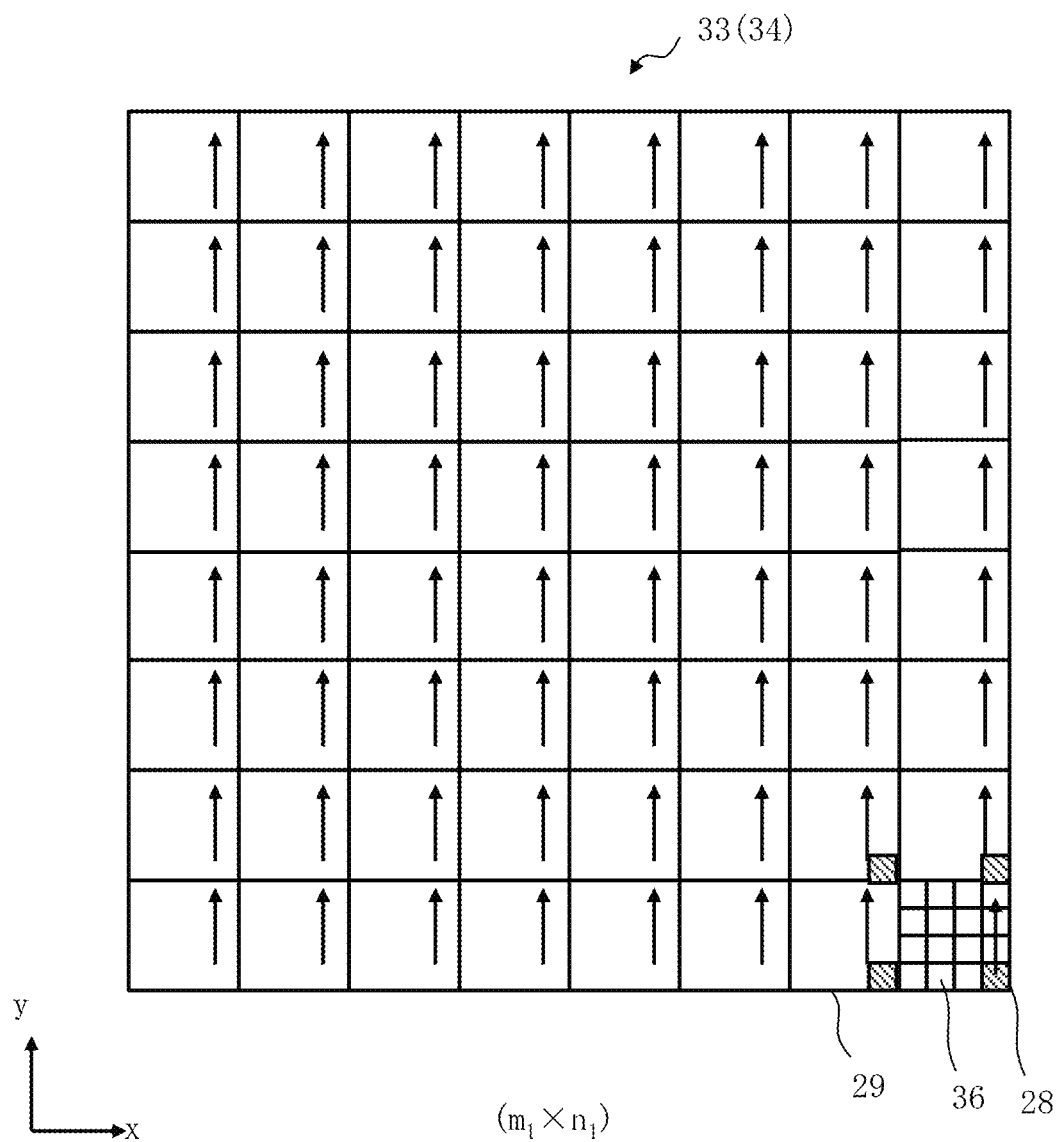
FIG. 4 is a diagram illustrating an example of multiple beam irradiation regions and measurement pixels of Embodiment 1.

FIG. 4 is a diagram illustrating an example of multiple beam irradiation regions and a measurement pixel of Embodiment 1. In FIG. 4, each mask die 33 is divided into a plurality of mesh regions having a mesh shape by, for example, the beam sizes of multiple beams. Each of such mesh regions corresponds to the measurement pixel 36 (the unit irradiation region). In the example of FIG. 4, a case of 8×8 rows of multiple beams is illustrated. The irradiation region 34 which can be irradiated with multiple beams 20 at one time is defined by (the size in the x direction obtained by multiplying the number of beams in the x direction by the pitch between the beams of multiple beams 20 in the x direction)×(the size of the y direction obtained by multiplying the number of beams in the y direction by the pitch between the beams of multiple beams 20 in the y direction). In the example of FIG. 4, a case in which the irradiation region 34 has the same size as that of the mask die 33 is illustrated. However, the invention is not limited thereto. The irradiation region 34 may be smaller or larger than the mask die 33. Then, a plurality of measurement pixels 28 (the beam irradiation position at one shot) which can be irradiated with multiple beams 20 for one time are illustrated inside the irradiation region 34. In other words, the pitch between the adjacent measurement pixels 28 corresponds to the pitch between the beams of multiple beams 20. In the example of FIG. 4, one sub-irradiation region 29 is formed by a square region surrounded by four adjacent measurement pixels 28 and including one measurement pixel 28 among the four measurement pixels 28. In the example of FIG. 4, a case in which each sub-irradiation region 29 includes 4×4 pixels 36 is illustrated.

The scanning operation of Embodiment 1 is performed for each mask die 33. In the example of FIG. 4, an example of a case in which one certain mask die 33 is scanned is illustrated. When all of multiple beams 20 are used, $m_1 \times n_1$ of the sub-irradiation regions 29 are arranged (in a two-dimensional shape) in the x and y directions inside one irradiation region 34. The XY stage 105 is moved to a position where multiple beams 20 can be irradiated in the first mask die 33. By the use of the main deflector 208, all of multiple beams 20 are collectively deflected toward the reference position of the mask die 33 scanned by multiple beams 20. The XY stage 105 is stopped at that position so that the inside of the mask die 33 is scanned by using the mask die 33 as the irradiation region 34. When the scanning operation is performed while the XY stage 105 is continuously moved, a tracking deflection is performed to follow the movement of the XY stage 105 by the main deflector 208. The beams constituting multiple beams are responsible for some different sub-irradiation regions 29. Then, each beam irradiates one measurement pixel 28 corresponding to the same position inside the responsible sub-irradiation region 29 at each shot. In the example of FIG. 4, each beam is deflected by the sub-deflector 209 so that the beam is irradiated to the first measurement pixel 36 from the right of the lowest step inside the responsible sub-irradiation region 29 at one shot. Then, an irradiation of one shot is performed. Next, the beam deflection positions of all of multiple beams 20 are collectively shifted by one measurement pixel 36 in the y direction using the sub-deflector 209 and are irradiated to the first measurement pixel 36 from the right of the second step at the lower side inside the responsible sub-irradiation region 29 at the second shot. Similarly, the multiple beams are irradiated to the first measurement pixel 36 from the right of the third step at the lower side inside the responsible sub-irradiation region 29 at the third shot. The multiple beams are irradiated to the first measurement pixel 36 from the right at the fourth steps at the lower side inside the responsible sub-irradiation region 29 at the fourth shot. Next, the beam deflection positions of all of multiple beams 20 are collectively shifted to the position of the second measurement pixel 36 from the right of the lowest step by the sub-deflector 209 to sequentially irradiate the measurement pixel 36 in the y direction in the same way. By repeating such an operation, all measurement pixels 36 inside one sub-irradiation region 29 are sequentially irradiated by one beam. At one shot, secondary electrons 300 corresponding to the shots as many as the holes 22 to maximum are detected at one time by multiple beams formed while passing through the holes 22 of the shaping aperture array substrate 203.

As described above, the mask die 33 corresponding to the irradiation region 34 is scanned by all of multiple beams 20, but each beam scans each corresponding one sub-irradiation region 29. Then, when the scanning of one mask die 33 ends, the stage moves so that the adjacent next mask die 33 becomes the irradiation region 34 so that such an adjacent next mask die 33 is scanned. By repeating such an operation, each chip 332 is scanned. By the shot of multiple beams 20, secondary electrons 300 are emitted from the measurement pixel 36 irradiated at each time and are detected by the detector 222. In Embodiment 1, in the unit detection region size of the detector 222, secondary electrons 300 emitted upward from each measurement pixel 36 are detected for each measurement pixel 36 (or each sub-irradiation region 29).

When the scanning is performed by using multiple beams 20 as described above, it is possible to perform a scanning operation (measurement) at a high speed compared to a case in which the scanning is performed by the single beam. In addition, each mask die 33 may be scanned by the step-and-repeat operation and each mask die 33 may be scanned while continuously moving the XY stage 105. When the irradiation region 34 is smaller than the mask die 33, the scanning operation may be performed while moving the irradiation region 34 inside the mask die 33.

When the substrate 101 is the exposure mask substrate, the chip region for one chip formed on the exposure mask substrate is divided into, for example, a plurality of stripe regions in the form of a stripe with the size of the mask die 33. Then, each mask die 33 may be scanned by the above-described operation for each stripe region. Since the size of the mask die 33 in the exposure mask substrate before the transfer, the size becomes four times the mask die 33 of the semiconductor substrate. For that reason, when the irradiation region 34 is smaller than the mask die 33 in the exposure mask substrate, the number of scanning operations increases by one chip (for example, four times). However, since the exposure mask substrate is provided with a pattern for one chip, the number of scanning operations may be smaller than that of the semiconductor substrate provided with chips more than four chips.

As described above, the image acquiring mechanism 150 scans the inspection target substrate 101 provided with the figure by using multiple beams 20 and detects multiple secondary electrons 300 emitted from the inspection target substrate 101 due to the irradiation of multiple beams 20. The secondary electron detection data (the measurement image, the secondary electron image, and the inspection target image) from each measurement pixel 36 detected by the multi-detector 222 is output to the detection circuitry 106 according to a measurement procedure. Analog detection data is converted into digital data by an A/D converter (not illustrated) inside the detection circuitry 106 and is stored in the chip pattern memory 123. In this way, the image acquiring mechanism 150 acquires the measurement image of the pattern formed on the substrate 101. Then, for example, at a step in which the detection data for one chip 332 is stored, the detection data is transmitted as the chip pattern data to the comparison circuitry 108 along with the information indicating each position from the position circuitry 107.

When performing the die to die inspection, the measurement image data obtained by capturing the same pattern at different positions on the same substrate 101 are compared with each other. For that reason, the image acquiring mechanism 150 acquires measurement images which are secondary electron images of one figure (the first figure) and the other figure (the second figure) from the substrate 101 having the same figures (the first and second figures) formed at different positions using multiple beams 20 (the electron beam). In such a case, one acquired figure measurement image corresponds to a reference image and the other figure measurement image corresponds to an inspection target image. The acquired images of one figure (the first figure) and the other figure (the second figure) may exist within the same chip pattern data or may be divided into different chip pattern data. Hereinafter, in Embodiment 1, a case of performing the die to die inspection will be chiefly described. Additionally, the following configuration can be also applied to a case of performing a die to database inspection.

Figure 5:
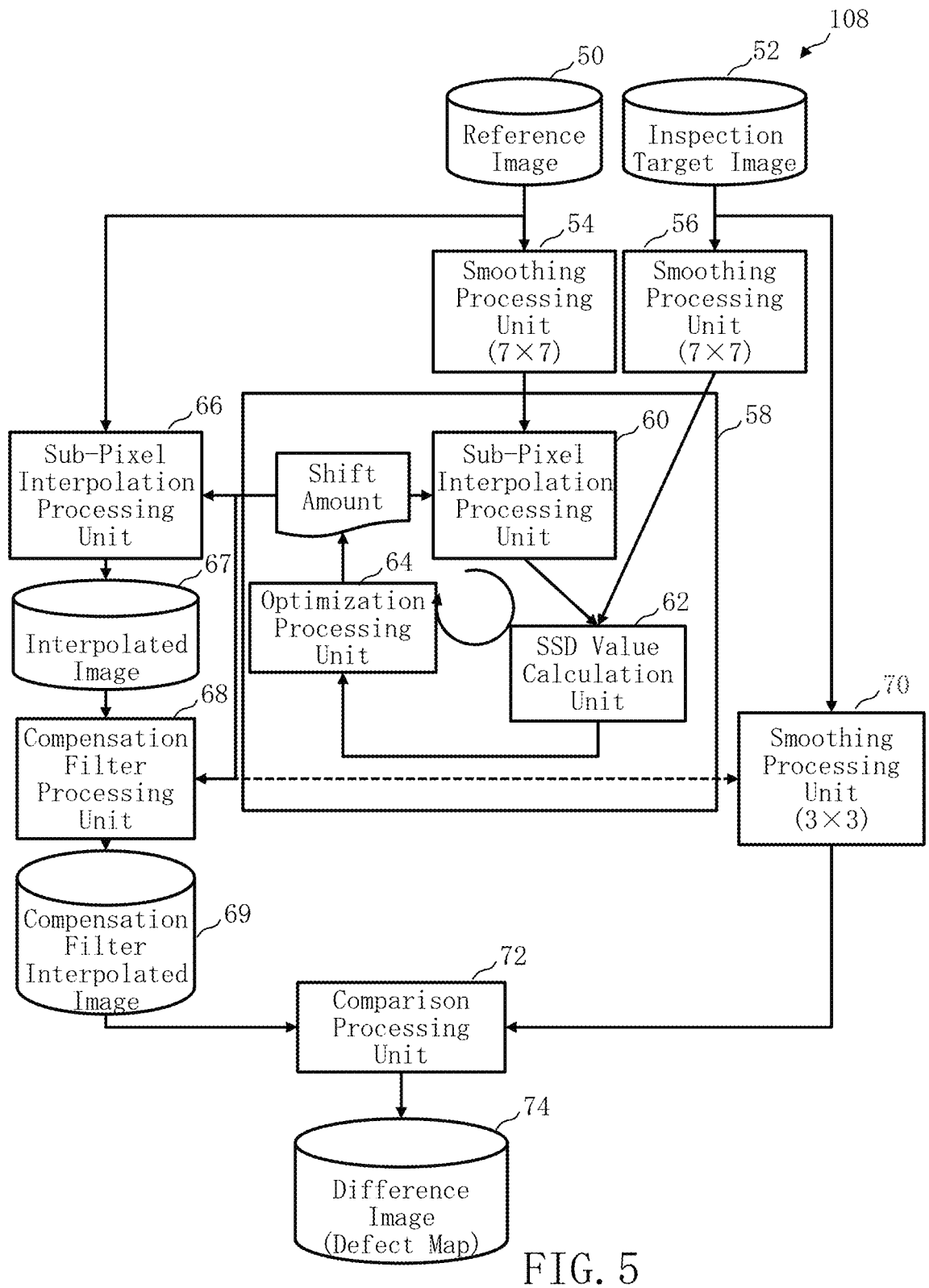
FIG. 5 is an example of an internal configuration diagram illustrating a configuration inside a comparison circuitry of Embodiment 1.

FIG. 5 is an example of an internal configuration diagram illustrating a configuration inside a comparison circuitry of Embodiment 1. In FIG. 5, storage devices 50, 52, 67, 69, and 74 such as magnetic disk drives, smoothing processing units 54 and 56, an alignment unit 58, a sub-pixel interpolation processing unit 66, a compensation filter processing unit 68, a smoothing processing unit 70, and a comparison processing unit 72 are disposed inside the comparison circuitry 108. As an internal configuration, a sub-pixel interpolation processing unit 60, a Sum of Squared Difference (SSD) value calculation unit 62, and an optimization processing unit 64 are disposed inside the alignment unit 58. The "units" such as the smoothing processing units 54 and 56, the alignment unit 58 (the sub-pixel interpolation processing unit 60, the SSD value calculation unit 62, and the optimization processing unit 64), the sub-pixel interpolation processing unit 66, the compensation filter processing unit 68, the smoothing processing unit 70, and the comparison processing unit 72 include a processing circuitry and the processing circuitry includes an electric circuitry, a computer, a processor, a circuitry substrate, a quantum circuitry, or a semiconductor device. Further, the "units" may use a common processing circuitry (the same processing circuitry). Alternatively, a different processing circuitry (another processing circuitry) may be used. Input data or calculation result necessary for the smoothing processing units 54 and 56, the alignment unit 58 (the sub-pixel interpolation processing unit 60, the SSD value calculation unit 62, and the optimization processing unit 64), the sub-pixel interpolation processing unit 66, the compensation filter processing unit 68, the smoothing processing unit 70, and the comparison processing unit 72 is stored in a memory (not illustrated) at each time.

The measurement data obtained by the image acquiring mechanism 150 corresponds to, for example, an example of an alignment target image region and constitutes, for example, an image of each mask die 33. In the measurement data transmitted to the comparison circuitry 108, the image (the mask die image) of the mask die 33 to be the inspection target image is stored (memorized) in the storage device 52 (the first storage device). The image (the mask die image) of the mask die 33 to be the reference image corresponding to the inspection target image is stored (memorized) in the storage device 50 (the second storage device).

In the comparison circuitry 108, the mask die image to be the inspection target image and the mask die image to be the reference image are aligned to each other.

Here, the pixel value of the reference image captured by using the electron beam can be replaced with the sum of the noise component and the pixel value without noise. The same applies to the pixel value of the inspection target image. Thus, the SSD value used for the alignment can be defined by the following equation (1).

$$\text{SSD value} = \Sigma(\text{difference in pixel value without noise})^2 + \Sigma(\text{difference in noise component})^2 \quad (1)$$

In the image capturing by the electron beam, as described above, since the number of incident electrons e per pixel is smaller than the number of photons when capturing an image using a laser beam, the value of the second term on the right side may be larger than the value of the first term on the right side of the expression (1) in some cases. For that reason, an influence on the SSD value from the value of the second term on the right side increases. In such a case, the noise level of the interpolated image changes depending on the image shift amount for interpolation as described below. When the noise level changes depending on the image shift amount, such a change amount largely influences the SSD value, so that the original figures cannot be aligned to each other. Thus, since the alignment is performed with high accuracy, the alignment may be performed after eliminating the noise component itself corresponding to the base of the second term on the right side or the alignment may be performed after eliminating a change amount depending on the image shift amount of the noise component corresponding to the base of the second term on the right side. Here, in Embodiment 1, a configuration in which the alignment is performed after eliminating the noise component itself will be described below.

The smoothing processing unit 56 (the first smoothing processing unit) performs a smoothing process (first smoothing process) of smoothing a pattern end of the figure in the mask die image corresponding to the inspection target image. Similarly, the smoothing processing unit 54 (the second smoothing processing unit) performs a smoothing process (second smoothing process) of smoothing a pattern end of the figure in the reference image. It is preferable to use, for example, a Gaussian filter as a filter for the smoothing process.

Figure 6:
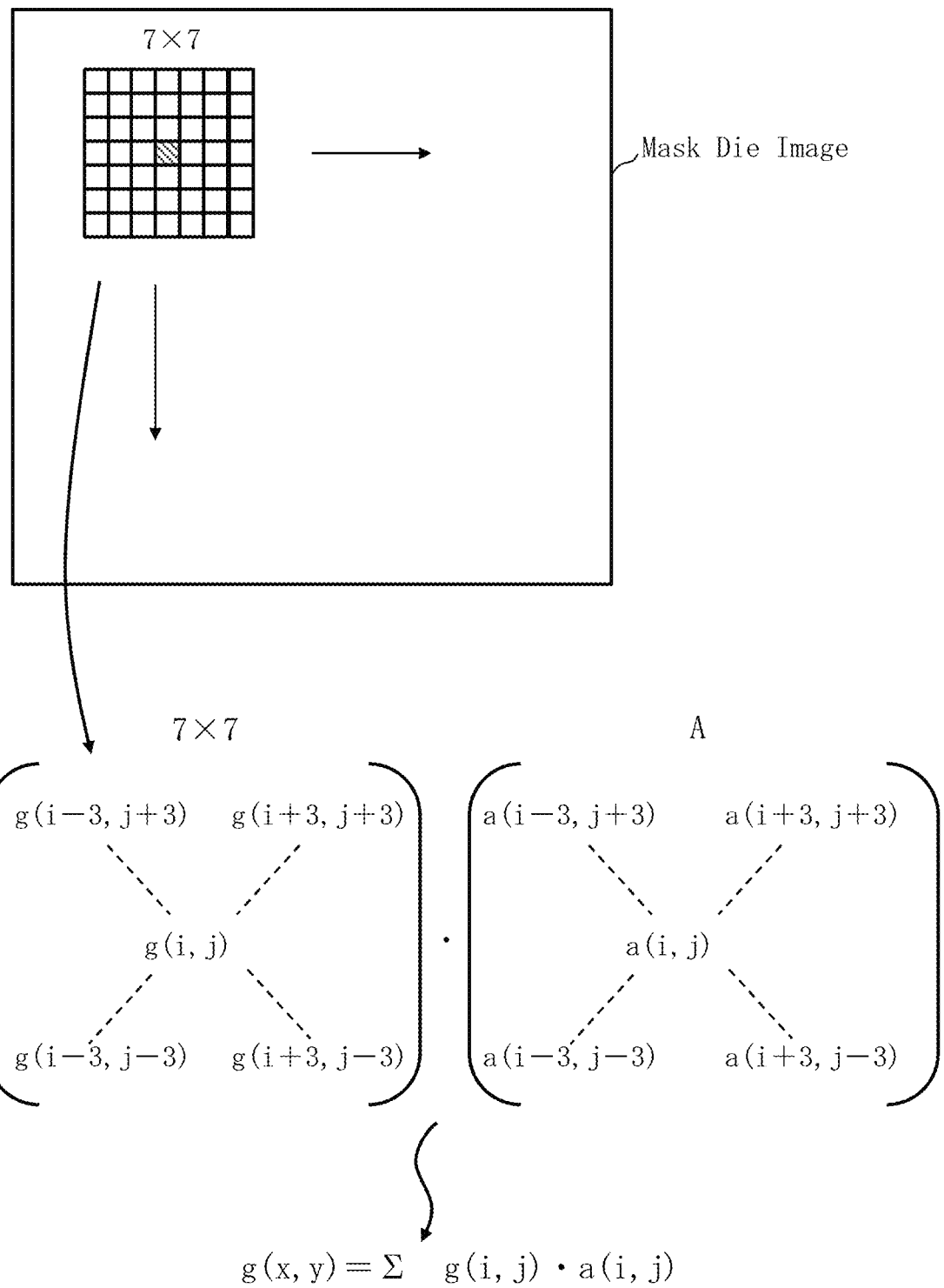
FIG. 6 is a diagram illustrating the contents of a smoothing process of Embodiment 1.

FIG. 6 is a diagram illustrating the contents of the smoothing process of Embodiment 1. In the example of FIG. 6, a case of using a filter A (Gaussian filter) indicated by a matrix of 7 rows×7 columns is illustrated. However, the invention is not limited thereto. For example, a Gaussian filter of 5 rows×5 columns may be used. Alternatively, a Gaussian filter of a matrix larger than 7 rows×7 columns may be used. Each element value a of the filter A is set so that the center element value a(i, j) is the largest and the element value decreases as it is moves away from the center. For example, several values of 1/4096, 6/4096, 15/4096, 20/4096, 36/4096, 90/4096, 120/4096, 225/4096, 300/4096, and 400/4096 are set. In such a case, the center element value a(i, j) becomes 400/4096. Further, all element values a(i−3, j−3), a(i+3, j−3), a(i−3, j+3), and a(i+3, j+3) at four corners become 1/4096. In this case, σ is about 1.3. Each element value a of 7×7 pixels is applied to one pixel so that a region of 7×7 pixels is shifted by one pixel at a time in two dimensions, for example, in the mask die image of 512×512 pixels. Then, at each shift position, the pixel value g(x, y) of the center pixel of 7×7 pixels is calculated. The pixel value g(x, y) of the center pixel can be defined according to the following equation (2) (a Gaussian filter function).

$$g(x,y)=\Sigma g(i,j) \cdot a(i,j) \qquad (2)$$

Additionally, in the above-described example, the pixel value g(x, y) of the center pixel at each shift position is calculated by using the filter A indicated by the two-dimensional matrix of 7 rows×7 columns, but the invention is not limited thereto. For example, the smoothing process may be performed by using seven rows of one-dimensional filters in the x direction and seven columns of one-dimensional filters in the y direction. In such a case, for example, the values of 1/64, 6/64, 15/64, 20/64, 15/64, 6/64, and 1/64 are set in order. When the pixel value of the smoothing process in the x direction and the pixel value of the smoothing process in the y direction are different values, for example, an average value of both values may be used.

With such a smoothing process, it is possible to reduce noise including shot noise of the inspection target image and the reference image. In particular, as the number of elements of the matrix of the Gaussian filter increases, the effect can be increased. In Embodiment 1, it is possible to substantially eliminate the noise by using the Gaussian filter indicated by the matrix of 7 rows×7 columns. In this way, the shift amount for alignment is calculated as follows while noise is substantially eliminated.

First, the sub-pixel interpolation processing unit 60 (the first sub-pixel interpolation processing unit) calculates the pixel value of the reference image corresponding to the position of each pixel of the inspection target image by performing an interpolation process using at least one pixel value of the reference image subjected to the smoothing process for each shift amount while variably and relatively shifting the reference image and the inspection target image subjected to the smoothing process by the unit of the sub-pixel. In Embodiment 1, a case in which the mask die image corresponding to the reference image subjected to the smoothing process is shifted by the unit of the sub-pixel while the inspection target image subjected to the smoothing process is fixed will be described. When one pixel is defined, for example, with 256 gradations, it is preferable to shift by, for example, 1/16 pixel or 1/8 pixel in the x and y directions.

Figure 7:
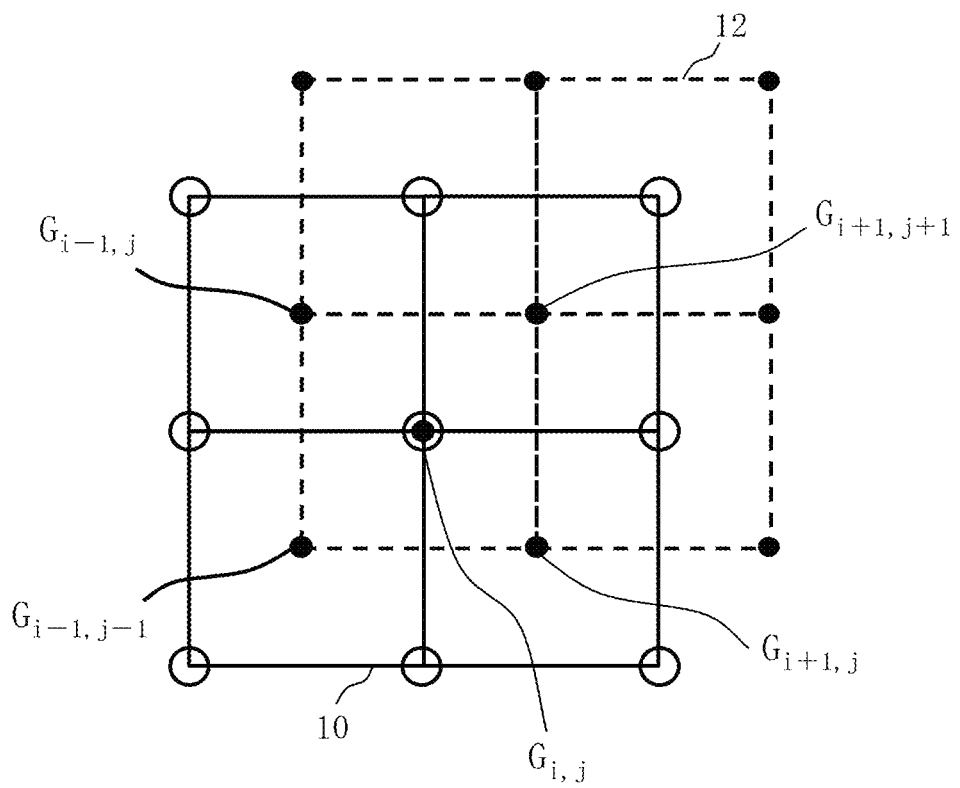
FIG. 7 is a diagram illustrating a pixel position obtained by a sub-pixel interpolation process of Embodiment 1.

FIG. 7 is a diagram illustrating a pixel position obtained by the sub-pixel interpolation process of Embodiment 1. In the example of FIG. 7, when the reference image 12 is shifted by the unit of the sub-pixel in the inspection target image 10, the interpolation pixels $G_{i,j}$ of the reference image 12 to be compared with the center pixel of 3×3 pixels of the inspection target image 10 are located at a position surrounded by the pixel $G_{i-1}$, the pixel $G_{i+1,j-1}$, the pixel $G_{i-1,j+1}$, and the pixel $G_{i+1,j+1}$, of the reference image 12. Thus, the pixel value of the interpolation pixel $G_{i,j}$ of the reference image 12 is interpolated by using the pixel value of the pixel of the peripheral reference image 12. Accordingly, it is possible to compare the inspection target image 10 and the reference image 12 with each other at the pixel alignment position of the inspection target image 10. Here, as the "pixel of the peripheral reference image 12", for example, it is better to use 4×4=16 pixels including not only 2×2=4 pixels but also the pixels around the outside. Here, decomposition is performed by the one-dimensional interpolation, an interpolation using four pixels including the left two pixels and the right two pixels is performed, and then an interpolation of the upper two pixels and the lower two pixels are continued.

Figures 8A, 8B:
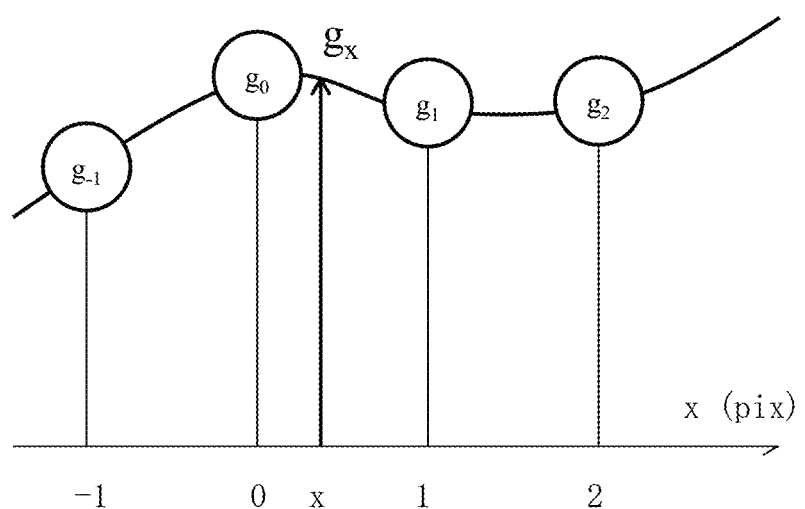
FIGS. 8A and 8B are diagrams illustrating a method of the sub-pixel interpolation process of Embodiment 1.

FIGS. 8A and 8B are diagrams illustrating a method of the sub-pixel interpolation process of Embodiment 1. In the example of FIGS. 8A and 8B, an interpolation process in the case of shifting an image in a one-dimensional direction (the x direction) is illustrated. In FIG. 8A, when the reference image is shifted, an interpolation is performed by using the pixel values ($g_{-1}$, $g_0$, $g_1$, $g_2$) of the peripheral pixels (−1, 0, 1, 2) of totally four pixels including two adjacent pixels at each of both sides in the shifting direction in a case where the pixel value gx at each pixel position of the inspection target image is obtained by an interpolation. In such a case, a case in which the target pixel between the peripheral pixel (0) and the peripheral pixel (1) is shifted from the peripheral pixel (0) by the shift amount x is illustrated. The pixel value gx of the target pixel in such a case can be defined by the linear sum using the pixel values of four peripheral pixels as illustrated in FIG. 8B. Specifically, the pixel value can be defined by the equation (3) (the interpolation filter function) illustrating the sum of the values obtained by multiplying the weighting factors $q_{-1}$ to $q_2$ by the pixel values of four peripheral pixels.

$$gx = q_{-1} \cdot g_{-1} + q_0 \cdot g_0 + q_1 \cdot g_1 + q_2 \cdot g_2 \qquad (3)$$

In such a case, the weighting factors $q_{-1}$ to $q_2$ are defined by the function depending on the shift amount x. As illustrated in FIG. 8B, the weighting factors are defined so that the sum of the weighting factors $q_{-1}$ to $q_2$ becomes 1 and the sum of squares of the weighting factors $q_{-1}$ to $q_2$ becomes the function f(x) depending on the shift amount x. The weighting factors $q_{-1}$ to $q_2$ may be a linear function of the shift amount x or may be a second or higher order function. For example, a cubic function is used.

When an image is shifted in the two-dimensional direction (the x and y directions), an image may be shifted in the one-dimensional direction (the x direction) by the above-described method and may be further shifted in the one-dimensional direction (the y direction) by the same method.

Next, the SSD value calculation unit 62 (the SSD calculation unit) calculates the sum of squared difference (SSD) between each pixel value of the inspection target image and the pixel value of the reference image subjected to the interpolation process every shift amount.

Next, the optimization processing unit 64 calculates the image shift amount in which the sum of squared difference (SSD) is minimized. For that reason, the optimization processing unit 64 variably shifts the image shift amount and outputs the image shift amount set at each time to the sub-pixel interpolation processing unit 60. Then, the sub-pixel interpolation processing unit 60 interpolates the reference image by the image shift amount set as described above and the SSD value calculation unit 62 calculates the sum of squared difference (SSD) and outputs the calculation result to the optimization processing unit 64. As described above, the optimization processing unit 64 obtains the image shift amount in which the sum of squared difference (SSD) is minimized. The image shift amount in which the sum of squared difference (SSD) obtained by the above-described repeated calculation is minimized is output to the sub-pixel interpolation processing unit 66.

As described above, in Embodiment 1, since the image shift amount is obtained by substantially eliminating noise including shot noise through the smoothing process, it is possible to obtain the image shift amount for the alignment which is not influenced by noise. However, since the strong smoothing process is performed with a degree capable of eliminating noise, each pixel value is largely changed and the image is in a so-called blurred state. Thus, it is difficult to obtain a highly accurate result even when the images are compared in the current state. Here, both images to be subjected to the smoothing process are aligned to each other by using the obtained image shift amount.

The sub-pixel interpolation processing unit 66 (the second sub-pixel interpolation processing unit) reads the mask die image corresponding to the reference image not subjected to the smoothing process from the storage device 50 and calculates the pixel value of the reference image corresponding to the position of each pixel of the inspection target image by performing an interpolation process with the image shift amount in which the sum of squared difference is minimized using at least one pixel value of the reference image not subjected to the smoothing process. Accordingly, it is possible to perform an interpolation process on the reference image with the highly accurate image shift amount capable of aligning the origin figures to each other without the influence of noise. The method of the interpolation process is the same as the description above. The interpolated image of the reference image subjected to the interpolation process with the image shift amount is stored in the storage device 68.

Here, the shot noise component is included in the pixel value of the reference image not subjected to the strong smoothing process. Then, the square root of the function f(x) depending on the shift amount x defined by the sum of squares of the weighting factors $q_{-1}$ to $q_2$ of the interpolation process indicates the ratio of the level of the shot noise. In other words, the level of the shot noise decreases as the square root of the function f(x) depending on the shift amount x decreases. Thus, the level of the shot noise changes depending on the shift amount x. For that reason, also in the interpolation process using the sub-pixel interpolation processing unit 66, the pixel value obtained by that process includes a variation of the level of the shot noise depending on the shift amount x.

Figure 9A:
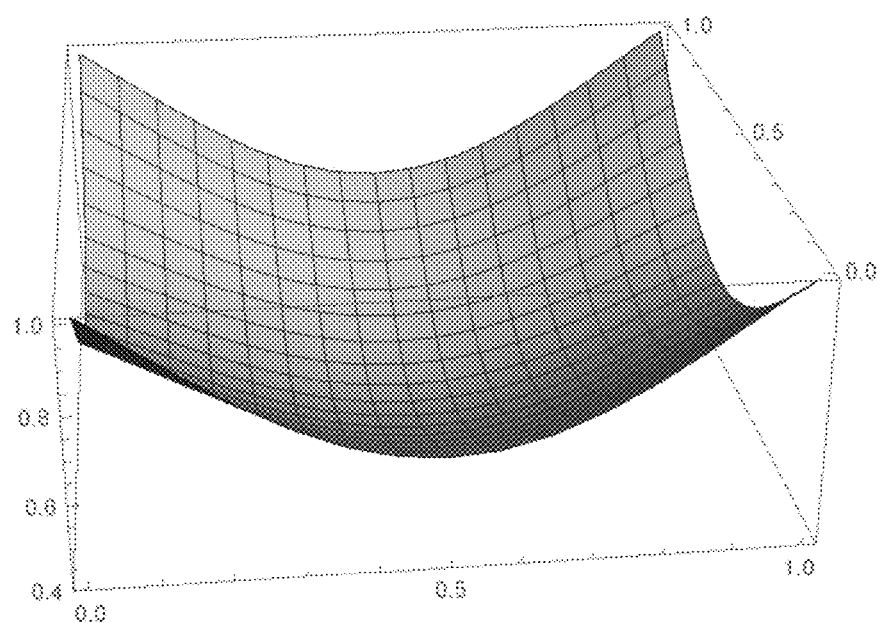
FIGS. 9A and 9B illustrate an example of a relationship between a sub-pixel shift amount and a noise level of Embodiment 1.
Figure 9B:
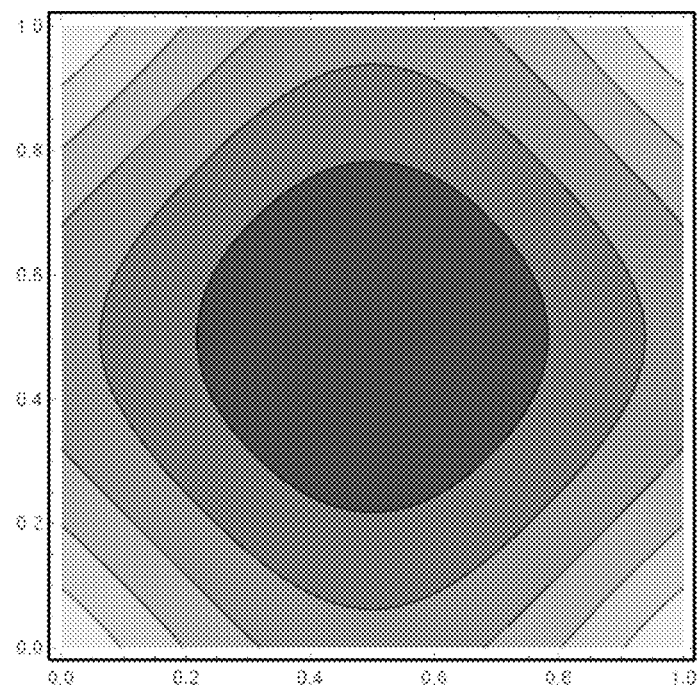

FIGS. 9A and 9B illustrate an example of a relationship between the sub-pixel shift amount and the noise level of Embodiment 1. FIG. 9A illustrates the ratio of the noise level in three dimensions. FIG. 9B illustrates the ratio of the noise level in two dimensions. In any case, since it is not possible to obtain an average effect due to the interpolation process when the shift amount x by the unit of the sub-pixel is zero, the ratio of the noise level becomes 1 to maximum. In contrast, since the shift amount x by the unit of the sub-pixel increases toward 1/2 pixels, it is understood that the ratio of the noise level decreases and the shift amount x becomes a minimum value at 1/2 pixels. The average effect is maximized at equal distances from peripheral pixels. As a result of simulation, it is understood that the ratio of the noise level decreases to, for example, 0.64 (64%) of the minimum value at the interpolated value at the time of shifting 1/2 pixels in the x and y directions.

Figure 10A:
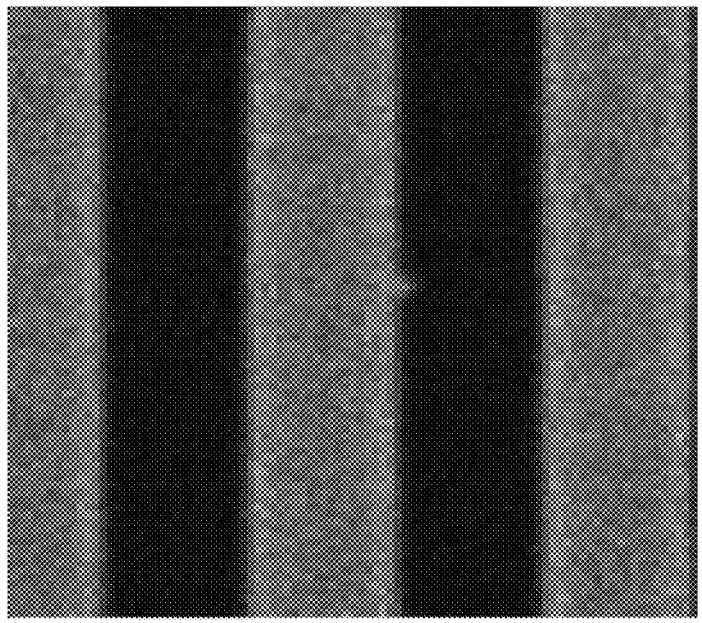
FIGS. 10A and 10B are diagrams illustrating an example of an interpolated image when performing an interpolation process by shifting a reference image of Embodiment 1.
Figure 10B:
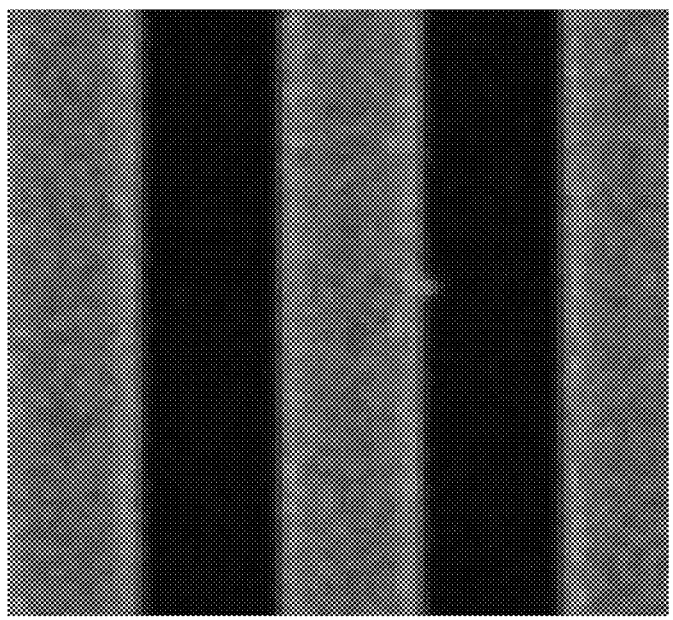

FIGS. 10A and 10B are diagrams illustrating an example of the interpolated image when the interpolation process is performed by shifting the reference image of Embodiment 1. FIG. 10A illustrates an example of an image when the shift amount is zero. In contrast, FIG. 10B illustrates an example of the interpolated image in which the pixel value is interpolated at the time of shifting 1/2 pixels in the x and y directions. In the image illustrated in FIG. 10B, since the average of the pixel value is obtained due to the interpolation, the edge of the pattern is blurred. However, at the same time, the level of the shot noise is minimized due to the average.

As described above, a variation of the level of the shot noise depending on the shift amount x is included in each pixel value of the interpolated image of the reference image subjected to the interpolation process by the sub-pixel interpolation processing unit 66. Thus, a deviation corresponding to a variation of the level of the shot noise depending on such a shift amount x occurs between the interpolated image (the reference image) and the inspection target image in the comparison with the inspection target image not subjected to the interpolation process. In other words, it is difficult to compare images with each other at the same noise level condition. Here, in Embodiment 1, a filter process of eliminating a change in noise level depending on such a shift amount x is performed.

The compensation filter processing unit 68 (the filter processing unit) performs a filter process on the reference image subjected to the interpolation process with the shift amount in which the sum of squared difference is minimized by using a filter function of suppressing the influence of noise depending on the shift amount.

Figures 11A, 11B:
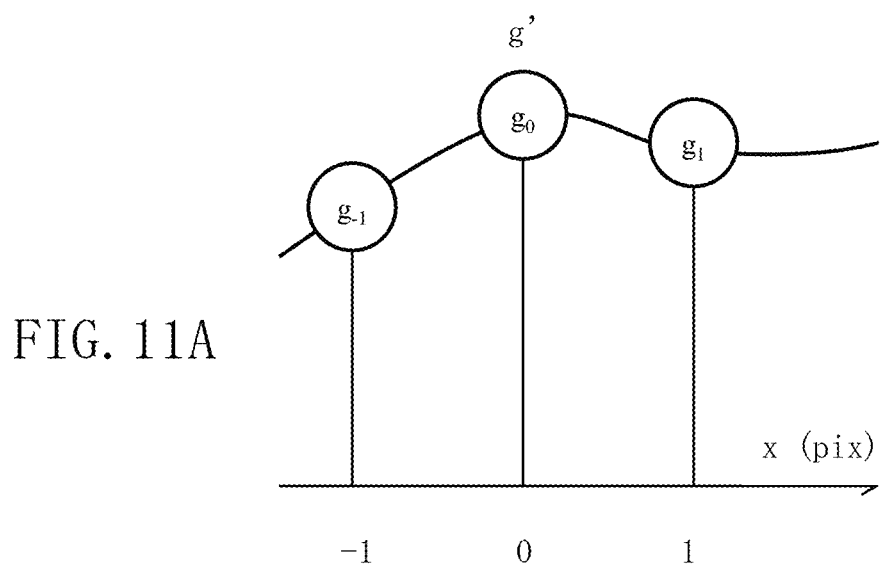
FIGS. 11A and 11B are diagrams illustrating a method of a compensation filter process of Embodiment 1.

FIGS. 11A and 11B are diagrams illustrating a method of the compensation filter process of Embodiment 1. In the example of FIGS. 11A and 11B, the filter process in the x direction is illustrated, but the same applies to the y direction. In FIG. 11A, when the pixel value g' in which a variation of the noise level depending on the shift amount x is eliminated is obtained for the pixel value of each pixel of the interpolated image (the reference image) subjected to the interpolation process, an interpolation is performed by using the pixel values ($g_{-1}$, $g_0$, $g_1$) of totally three pixels (−1, 0, 1) including the pixel subjected to the interpolation process and the pixels adjacent to both sides of the pixel in the shifting direction. In such a case, it is assumed that the target pixel is at the pixel (0). As described above, in the interpolation process using the sub-pixel interpolation processing unit 66, the ratio of the noise level of the shot noise is indicated by the square root of the function f(x) depending on the shift amount x. Thus, the square root of the function f(x') of the shift amount x' (x' is 0.5 pixels when only the reference image is shifted) in which the noise level becomes the minimum value is set such that the noise level is minimized. Here, the pixel value g' of the target pixel in such a case can be defined by the linear sum using the pixel values of three pixels as illustrated in FIG. 11B. Specifically, the pixel value can be defined by the equation (4) (the compensation filter function) illustrating the sum of two values obtained by multiplying the weighting factor $c_1$ by the pixel values of the peripheral pixels and the value obtained by multiplying the weighting factor $c_0$ by the pixel value.

$$g' = c_1 \cdot g_{-1} + c_0 \cdot g_0 + c_1 \cdot g_1 \qquad (4)$$

In such a case, as illustrated in FIG. 11B, the weighting factors are defined so that the sum of the weighting factors $c_1$, $c_0$, and $c_1$ becomes 1 and the sum of squares of the weighting factors $c_1$, $c_0$, and $c_1$ becomes the value obtained by dividing the function $f(x')$ having a minimal noise level by the function f(x) depending on the shift amount x. The weighting factors $c_0$ and $c_1$ may be a linear function of the shift amount x or may be a second or higher order function. Additionally, $c_0$ and $c_1$ can be easily solved from FIG. 11B.

While the filter process in the x direction has been described, the same process is also performed in the y direction. For the image obtained by the filter process in the x direction, the filter process is also performed in the y direction by the same method. The compensation filter factor is determined by using the shift amount y in the y direction instead of x. At the time of performing the filter process on the two-dimensional data, for example, the one-dimensional filter process is first performed in the x direction and the one-dimensional filter process is further performed on the result in the y direction.

Since there is an influence of the function f(x) depending on the shift amount x at the time of performing the interpolation process by the sub-pixel interpolation processing unit 66, a variation of the noise level depending on the shift amount x occurring when the interpolation process has been already performed is eliminated by using the function f(x') in which the noise level is minimized as the sum of squares of the weighting factors $c_1$, $c_0$, and $c_1$ in the compensation filter process and multiplying 1/f(x) by the function f(x'). Accordingly, the interpolated image subjected to the compensation filter process can have the pixel value g' in a condition in which a variation of the noise level depending on the shift amount x is eliminated.

Figure 12A:
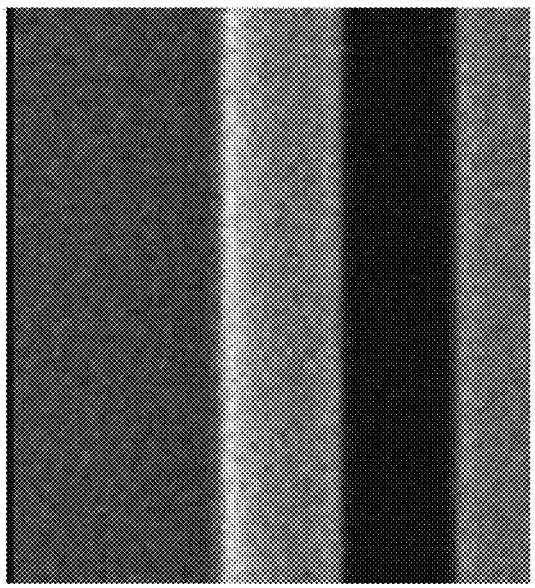
FIGS. 12A to 12D are diagrams illustrating an example of an interpolated image and a compensation filter interpolated image having a different shift amount of Embodiment 1.
Figure 12B:
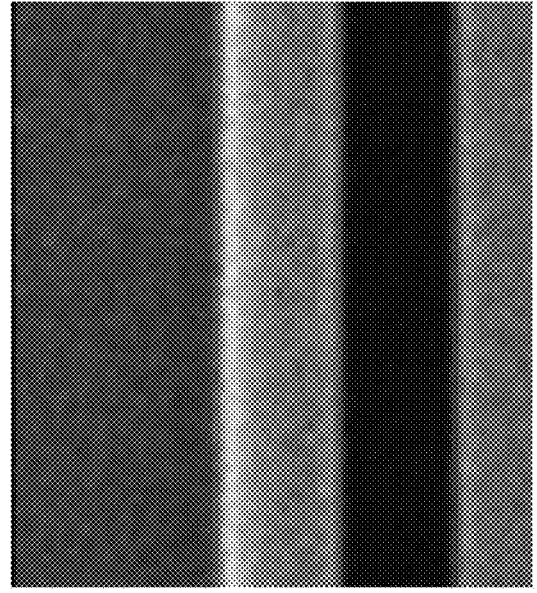
Figure 12C:
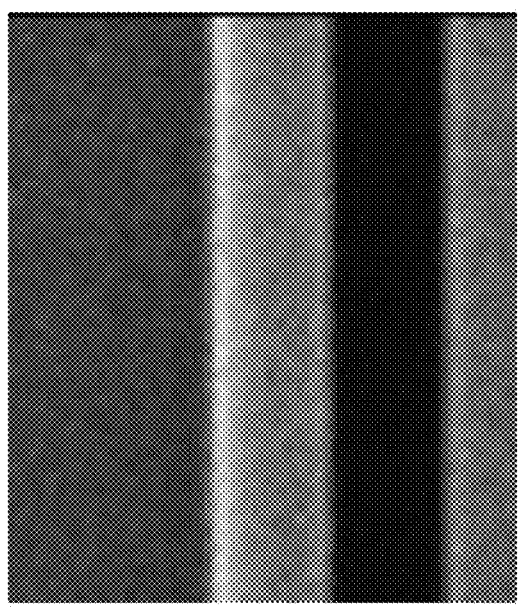
Figure 12D:
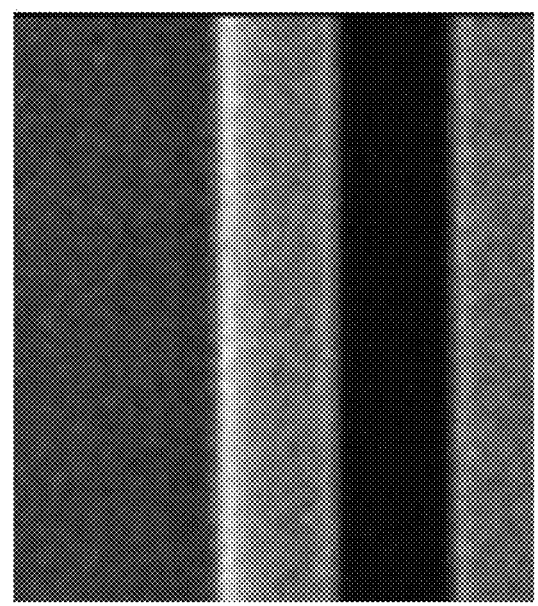

FIGS. 12A to 12D are diagrams illustrating an example of the interpolated image and the compensation filter interpolated image having a different shift amount of Embodiment 1. FIG. 12A illustrates an example of the interpolated image which is interpolated with the shift amount x=0. FIG. 12B illustrates an example of the interpolated image which is interpolated with the shift amount x=1/2 pixels. The noise level is largely different between the interpolated image illustrated in FIG. 12A and the interpolated image illustrated in FIG. 12B. In contrast, FIG. 12C illustrates the compensation filter interpolated image obtained by performing the compensation filter process on the interpolated image illustrated in FIG. 12A. Further, FIG. 12D illustrates the compensation filter interpolated image obtained by performing the compensation filter process on the interpolated image illustrated in FIG. 12B. The compensation filter interpolated image illustrated in FIG. 12C and the compensation filter interpolated image illustrated in FIG. 12D cannot be easily distinguished from each other with eyes, but can be evenly arranged so that the noise level is the same. Thus, a variation of the noise level depending on the shift amount x is eliminated due to the process of the compensation filter function. The compensation filter interpolated image obtained by the compensation filter process is stored in the storage device 69.

Meanwhile, as for the inspection target image, in the image subjected to the strong smoothing process capable of eliminating noise, each pixel value is largely changed and the image is in a so-called blurred state similarly to the reference image. Thus, it is difficult to obtain a highly accurate result even when the images are compared with each other. Further, since the interpolation process is not performed on the image to be subjected to the smoothing process, a variation of the noise level depending on the shift amount x does not occur.

Meanwhile, although a variation of the noise level depending on the shift amount x is eliminated by the compensation filter in the reference image, a smoothing effect by filtering using three pixels in the x and y directions is exhibited. Here, also in the inspection target image, the substantially same condition is obtained by performing the smoothing process capable of obtaining the same smoothing effect as that of the compensation filter process.

The smoothing processing unit 70 (the third smoothing processing unit) reads the mask die image corresponding to the inspection target image not to be subjected to the smoothing process from the storage device 20 and performs a weak smoothing process (third smoothing process) of slightly smoothing the pattern end on the figure in the mask die image corresponding to the inspection target image. As a filter for the smoothing process, a filter of using three pixels is performed in the x and y directions similar to the compensation filter processing unit 69. However, the factor obtained for x=y=0 is used as the filter factor at all times without changing the shift amount. Accordingly, a strong smoothing effect which is the same for the reference image and the inspection target image is input to the comparison processing unit 72 at the rear stage while the effect remains.

As described above, according to Embodiment 1, it is possible to highly accurately align the inspection target image and the reference image even when there is shot noise by the use of the smoothing process. Further, since a variation of the noise level depending on the image shift amount is eliminated by the compensation filter process, the same noise level can be obtained regardless of the shift amount obtained by the alignment. Further, also in the inspection target image, the noise level of the inspection target image can be set to be the same by using a filter having the same smoothing effect. In such a state, the inspection target image and the reference image are compared with each other.

The comparison processing unit 72 (the comparison unit) compares the inspection target image with the reference image subjected to the interpolation process with the shift amount in which the sum of squared difference is minimized while the smoothing process is performed thereon. Here, the inspection target image is further compared with the reference image (the compensation filter interpolated image) subjected to the compensation filter process. Specifically, the inspection target image and the reference image are compared with each other at each pixel. Both images are compared with each other at each pixel according to a predetermined determination condition using a predetermined threshold value to determine whether, for example, a defect such as a shape defect exists. For example, when a gradation value difference for each pixel is larger than a threshold value Th, this is determined as a defect candidate. Then, a comparison result is output. The comparison result may be output to the storage device 109, the monitor 117, or the memory 118 or from the printer 119.

Alternatively, the comparison processing unit 72 (the comparison unit) generates a contour line of the figure in the image from the inspection target image and the reference image (the compensation filter interpolated image). Then, a deviation between the contour lines of the matched figures may be compared. For example, when a deviation between the contour lines is larger than the threshold value Th', this is determined as a defect candidate. Then, a comparison result is output. The comparison result may be output to the storage device 109, the monitor 117, or the memory 118 or from the printer 119.

Additionally, in the above-described example, a case of performing the die to die inspection has been described, but the same applies to a case of performing the die to database inspection. In such a case, the reference image generating circuitry 112 generates the reference image for each mask die based on the design data of the pattern of the substrate 101 or the design pattern data defined by the exposure image data of the pattern formed in the substrate 101. Specifically, the operation is as below. First, the design pattern data is read from the storage device 109 through the control calculator 110 and each figure defined by the read design pattern data is converted into binary or multivalued image data.

Here, the figure which is defined by the design pattern data is based on, for example, a basic figure such as a rectangular shape or a triangular shape. For example, figure data is stored in which a shape, a size, a position, and the like of each pattern are defined by information such as coordinates (x, y) at the reference position of the figure, the length of the side, and the figure code as an identifier for distinguishing the figure type such as a rectangle or a triangle.

When the design pattern data corresponding to such figure data is input to the reference image generating circuitry 112, the design pattern data is expanded to the data for each figure so that the figure code, the figure dimension, and the like indicating the figure shape of the figure data is analyzed. Then, the result is expanded to binary or multivalued design pattern image data as a pattern arranged in a grid having a grid of a predetermined quantization size as a unit and is output. In other words, the design data is read, the occupation ratio of the figure in the design pattern for each of grids set as the unit of a predetermined dimension of the inspection region is calculated, and n-bit occupation data is output. For example, it is preferable to set one grid as one pixel. Then, when one pixel has a resolution of $1/2^8(=1/256)$, a small region of 1/256 is allocated by the region of the figure disposed inside the pixel and an occupation ratio inside the pixel is calculated. Then, the result is output as 8-bit occupation data to the reference circuitry 112. Such a grid (inspection pixel) may be aligned to the pixels of the measurement data.

Next, the reference image generating circuitry 112 performs an appropriate filter process on the design image data of the design pattern which is the image data of the figure. Since the optical image data corresponding to the measurement image is in a state where a filter is operated by the optical system, in other words, an analog state which continuously changes, the design image data in which the image density (gradation value) is digital design image data can be adjusted to the measurement data by applying the filter process thereon. The image data of the generated reference image is output to the comparison circuitry 108 and is stored in the memory 50. The process contents inside the comparison circuitry 108 may be the same as the case of the die to die inspection. The design image generated from the design data does not include shot noise. However, an image can be blurred depending on the shift amount x instead of the shot noise by the interpolation process during the alignment. Thus, it is possible to obtain the same effect as that of the case of the die to die inspection by performing the same process.

As described above, according to Embodiment 1, it is possible to align images while reducing the influence of noise. For that reason, it is possible to perform a highly accurate pattern inspection.

Embodiment 2

In Embodiment 1, a configuration of performing the alignment after eliminating the noise component itself has been described, but in Embodiment 2, a configuration of performing the alignment after eliminating a variation of the noise level depending on the image shift amount will be described. The configuration of the inspection apparatus 100 of Embodiment 2 is the same as that of FIG. 1. Hereinafter, contents other than those specifically described may be the same as those in Embodiment 1.

Figure 13:
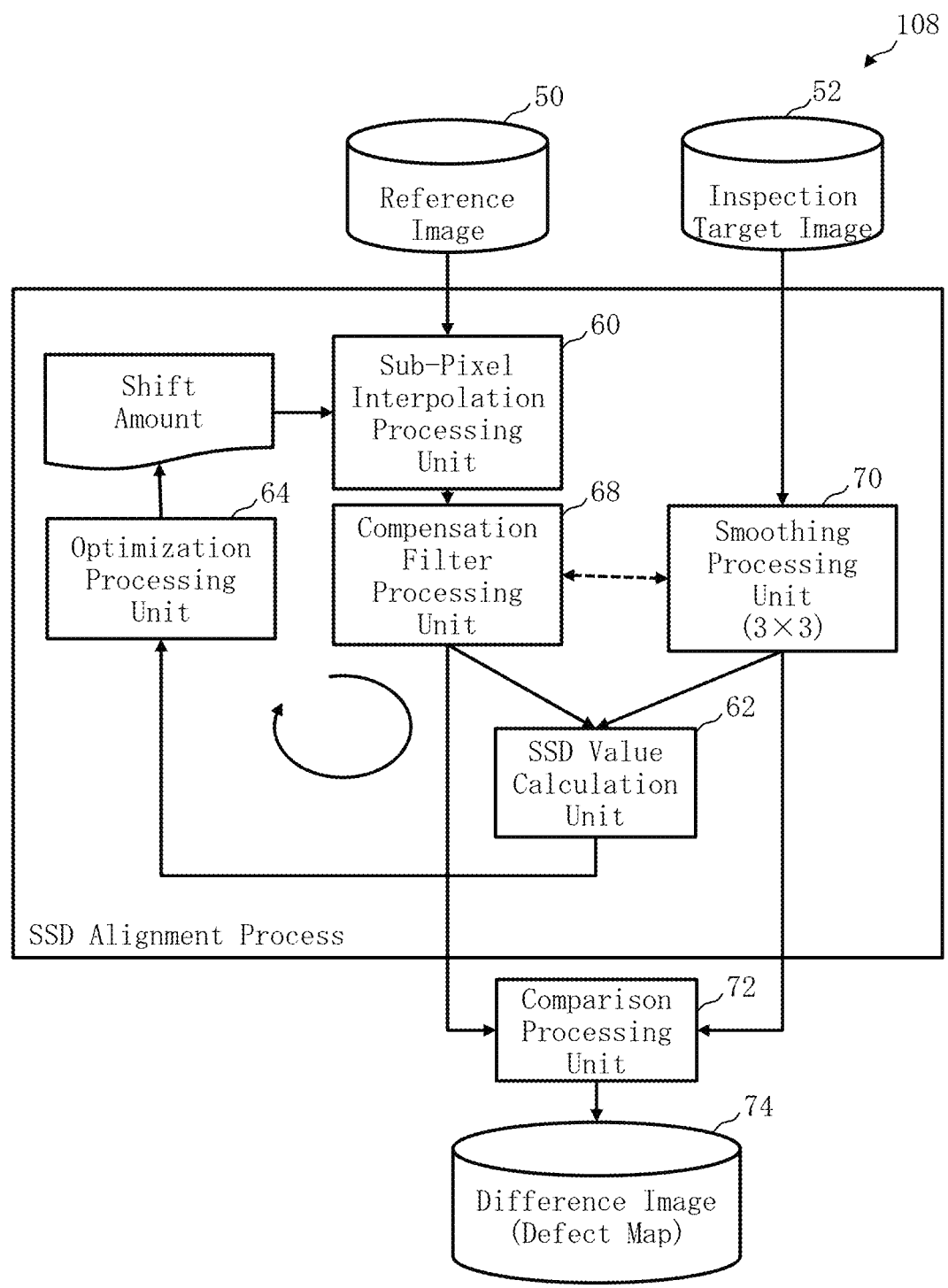
FIG. 13 is an example of an internal configuration diagram illustrating a configuration inside a comparison circuitry of Embodiment 2.

FIG. 13 is an example of an internal configuration diagram illustrating a configuration inside the comparison circuitry of Embodiment 2. In FIG. 13, the storage devices 50, 52, and 74 such as a magnetic disk drive, the alignment unit 58, and the comparison processing unit 72 are disposed inside the comparison circuitry 108. As an internal configuration, the sub-pixel interpolation processing unit 60, the SSD (Sum of Squared Difference) value calculation unit 62, the optimization processing unit 64, the compensation filter processing unit 68, and the smoothing processing unit 70 are disposed inside the alignment unit 58. The "units" such as the alignment unit 58 (the sub-pixel interpolation processing unit 60, the SSD value calculation unit 62, the optimization processing unit 64, the compensation filter processing unit 68, and the smoothing processing unit 70) and the comparison processing unit 72 include the processing circuitry and the processing circuitry includes an electric circuitry, a computer, a processor, a circuitry substrate, a quantum circuitry, or a semiconductor device. Further, the "units" may use a common processing circuitry (the same processing circuitry). Alternatively, a different processing circuitry (another processing circuitry) may be used. Input data or calculation result necessary for the alignment unit 58 (the sub-pixel interpolation processing unit 60, the SSD value calculation unit 62, the optimization processing unit 64, the compensation filter processing unit 68, and the smoothing processing unit 70), and the comparison processing unit 72 is stored in a memory (not illustrated) at each time. In Embodiment 1, the compensation filter process is performed on the original image after optimizing the image shift amount for the alignment inside the alignment unit 58, but in Embodiment 2, the compensation filter process is performed on an image within a loop for optimizing the image shift amount for the alignment inside the alignment unit 58 as illustrated in FIG. 13.

In the measurement data transmitted to the comparison circuitry 108, an image (mask die image) of the mask die 33 to be the inspection target image is stored (memorized) in the storage device 52 (the first storage device). An image (mask die image) of the mask die 33 to be the reference image corresponding to the inspection target image is stored (memorized) in the storage device 50 (the second storage device).

The sub-pixel interpolation processing unit 60 (the sub-pixel interpolation processing unit) calculates the pixel value of the reference image corresponding to the position of each pixel of the inspection target image by performing the interpolation process using at least one pixel value of the reference image for the each shift amount while variably and relatively shifting the inspection target image and the reference image by the unit of the sub-pixel using the reference image corresponding to the inspection target image. In Embodiment 2, a case of shifting the mask die image corresponding to the reference image not subjected to the smoothing process by the unit of the sub-pixel while the inspection target image not subjected to the smoothing process is fixed will be described. When one pixel is defined by, for example, 256 gradations, it is preferable to shift, for example, 1/16 pixels or 1/8 pixels in the x and y directions. In the method of the interpolation process, as described with reference to FIG. 8A, an interpolation is performed by using the pixel values ($g_{-1}$, $g_0$, $g_1$, $g_2$) of the peripheral pixels (−1, 0, 1, 2) of totally four pixels including two pixels adjacent to each other at each of both sides in the shifting direction when the pixel value gx at the position of each pixel of the inspection target image is interpolated at the time of shifting the reference image. In such a case, it is assumed that the target pixel is located between the peripheral pixel (0) and the peripheral pixel (1) and is shifted from the peripheral pixel (0) by the shift amount x. The pixel value gx of the target pixel in such a case can be defined by the linear sum using the pixel values of four peripheral pixels as illustrated in FIG. 8B. Specifically, the pixel value can be defined by the above-described equation (3) (the interpolation filter function) indicating the sum of the values obtained by multiplying the weighting factor $q_{-1}$ to $q_2$ by the pixel values of four peripheral pixels.

In such a case, the weighting factors $q_{-1}$ to $q_2$ are defined by the function depending on the shift amount x and are defined so that the sum of the weighting factors $q_{-1}$ to $q_2$ becomes 1 and the sum of square of the weighting factors $q_{-1}$ to $q_2$ becomes the function f (x) depending on the shift amount x as illustrated in FIG. 8B. The weighting factors $q_{-1}$ to $q_2$ may be linear functions of the shift amount x or may be a second or higher order function.

When an image is further shifted in the y direction, an interpolation may be also performed on the shift amount y.

As described above, a variation of the level of the shot noise depending on the shift amount x is included in each pixel value of the interpolated image of the reference image subjected to the interpolation process by the sub-pixel interpolation processing unit 60. Thus, a deviation corresponding to a variation of the level of the shot noise depending on the shift amount x occurs between the interpolated image (the reference image) and the inspection target image in the comparison with the inspection target image not subjected to the interpolation process. In other words, a comparison in the same noise level condition is difficult. Here, in Embodiment 2, the filter process of eliminating a variation of the noise level depending on the shift amount x is performed.

The compensation filter processing unit 68 (the filter processing unit) performs the filter process using the filter function of suppressing the influence of noise depending on the image shift amount on the pixel value of the reference image (the interpolated image) subjected to the interpolation process for the each shift amount. Specifically, as described with reference to FIG. 11A, an interpolation is performed on the pixel value of each pixel of the interpolated image (the reference image) subjected to the interpolation process by using the pixel values ($g_{-1}$, $g_0$, $g_1$) of totally three pixels (−1, 0, 1) including the pixel subjected to the interpolation process and each of the pixels adjacent to both sides of the pixel in the shifting direction at the time of obtaining the pixel value g' in which a variation of the noise level depending on the shift amount x is eliminated. In such a case, it is assumed that the target pixel is at the pixel (0). As illustrated in FIG. 11B, the pixel value g' of the target pixel in such a case can be defined by the linear sum using the pixel values of three pixels. Specifically, the pixel value can be defined by the above-described equation (3) (the compensation filter function) indicating the sum of two values obtained by multiplying the weighting factor $c_1$ by the pixel values of the peripheral pixels and the value obtained by multiplying the weighting factor $c_0$ by the pixel value.

In such a case, as illustrated in FIG. 11B, the sum of the weighting factors $c_1$, $c_0$, and $c_1$ is defined as 1 and the sum of squares of the weighting factors $c_1$, $c_0$, and $c_1$ is defined as the value obtained by dividing the function f(x') in which the noise level is minimized by the function f(x) depending on the shift amount x. The weighting factors $c_0$ and $c_1$ may be linear functions of the shift amount x or may be a second or higher order function. As described above, a variation of the noise level depending on the shift amount x generated when the interpolation process has performed is eliminated by multiplying 1/f(x) by the function f(x') in which the noise level is minimized. Accordingly, the interpolated image subjected to the compensation filter process can have the pixel value g' in a condition in which a variation of the noise level depending on the shift amount x is eliminated.

The filter process is also performed on the shift amount y in the same way. At the time of performing the filter process on the two-dimensional data, for example, the one-dimensional filter process is first performed in the x direction and the result is further subjected to the one-dimensional filter process in the y direction.

As described above, according to Embodiment 2, it is possible to generate the reference image (the interpolated image) in which a variation of the noise level depending on the image shift amount is eliminated at the step before the SSD value is calculated.

Meanwhile, since the interpolation process is not performed on the inspection target image, a variation of the noise level depending on the shift amount x does not occur. Meanwhile, in the reference image, a variation of the noise level depending on the shift amount x is eliminated by the compensation filter, but a smoothing effect according to the interpolation process using three pixels is exhibited in the x and y directions. Here, also in the inspection target image of Embodiment 2, the substantially same condition is obtained by performing the smoothing process capable of obtaining the same smoothing effect as that of the compensation filter process.

The smoothing processing unit 70 reads the mask die image to be the inspection target image not subjected to the smoothing process from the storage device 52 and performs the weak smoothing process of slightly smoothing the pattern end on the figure in the mask die image to be the inspection target image. As a filter for the smoothing process, it is preferable to use a filter which is the same as the compensation filter process in the case of the shift amount x=0 and y=0. Accordingly, it is possible to evenly arrange the noise levels of the reference image and the inspection target image. The contents of the weak smoothing process are the same as those of Embodiment 1.

Next, the SSD value calculation unit 62 (the SSD calculation unit) calculates the sum of squared difference (SSD) of each pixel value of the inspection target image and the corresponding pixel value of the reference image subjected to the compensation filter process after the interpolation process for the each shift amount.

Next, the optimization processing unit 64 calculates the image shift amount in which the sum of squared difference (SSD) is minimized. For that reason, the optimization processing unit 64 variably shifts the image shift amount and outputs the image shift amount set at each time to the sub-pixel interpolation processing unit 60. Then, the sub-pixel interpolation processing unit 60 interpolates the reference image with the image shift amount set as described above, the compensation filter processing unit 68 performs the compensation filter process, the smoothing processing unit 70 performs the weak smoothing process on the inspection target image, and the SSD value calculation unit 62 calculates the sum of squared difference (SSD) and outputs the calculation result to the optimization processing unit 64. As described above, the reference image (the compensation filter interpolated image) subjected to the interpolation process and the compensation filter process with the image shift amount in which the sum of squared difference (SSD) is minimized and which is calculated by the optimization processing unit 64 and the corresponding inspection target image subjected to the smoothing process are output to the comparison processing unit 72.

As described above, in Embodiment 2, the alignment with the inspection target image is performed by using the reference image (the compensation filter interpolated image) in which a variation of the noise level depending on the image shift amount x is eliminated by the interpolation using the compensation filter process.

The comparison processing unit 72 (the comparison unit) compares the inspection target image and the reference image with each other while the inspection target image and the reference image are aligned to each other by using the image shift amount in which the calculated sum of squared difference is minimized. As the comparison method, every pixel may be compared or a deviation between the contour lines of the figures may be compared. The comparison result may be output to the storage device 109, the monitor 117, or the memory 118 or from the printer 119.

Additionally, in the above-described example, a case of performing the die to die inspection has been described, but the example is the same as Embodiment 1 in that the invention can be also applied to the die to database inspection can be also performed.

As described above, according to Embodiment 2, since a variation of the noise level depending on the image shift amount is eliminated by the compensation filter process, the noise level can be the same regardless of the shift amount obtained by the alignment. Then, the alignment can be performed in such a state. Further, since the reference image (the compensation filter interpolated image) in which a variation of the noise level depending on the image shift amount is eliminated is generated at the step of optimizing the alignment, the reference image (the compensation filter interpolated image) generated already can be used for the comparison process. Thus, the configuration inside the comparison circuitry 108 can be simplified compared to Embodiment 1.

As described above, according to Embodiment 2, it is possible to align images while reducing the influence of noise. For that reason, it is possible to perform a highly accurate pattern inspection.

Embodiment 3

In the above-described embodiments, a case of shifting only the reference image with the alignment has been described, but the invention is not limited thereto. In Embodiment 3, a configuration of shifting both images including the reference image and the inspection target image to be complemented will be described. The configuration of the inspection apparatus 100 of Embodiment 3 is the same as that of FIG. 1. Hereinafter, contents other than those specifically described may be the same as those in Embodiment 1.

Figure 14:
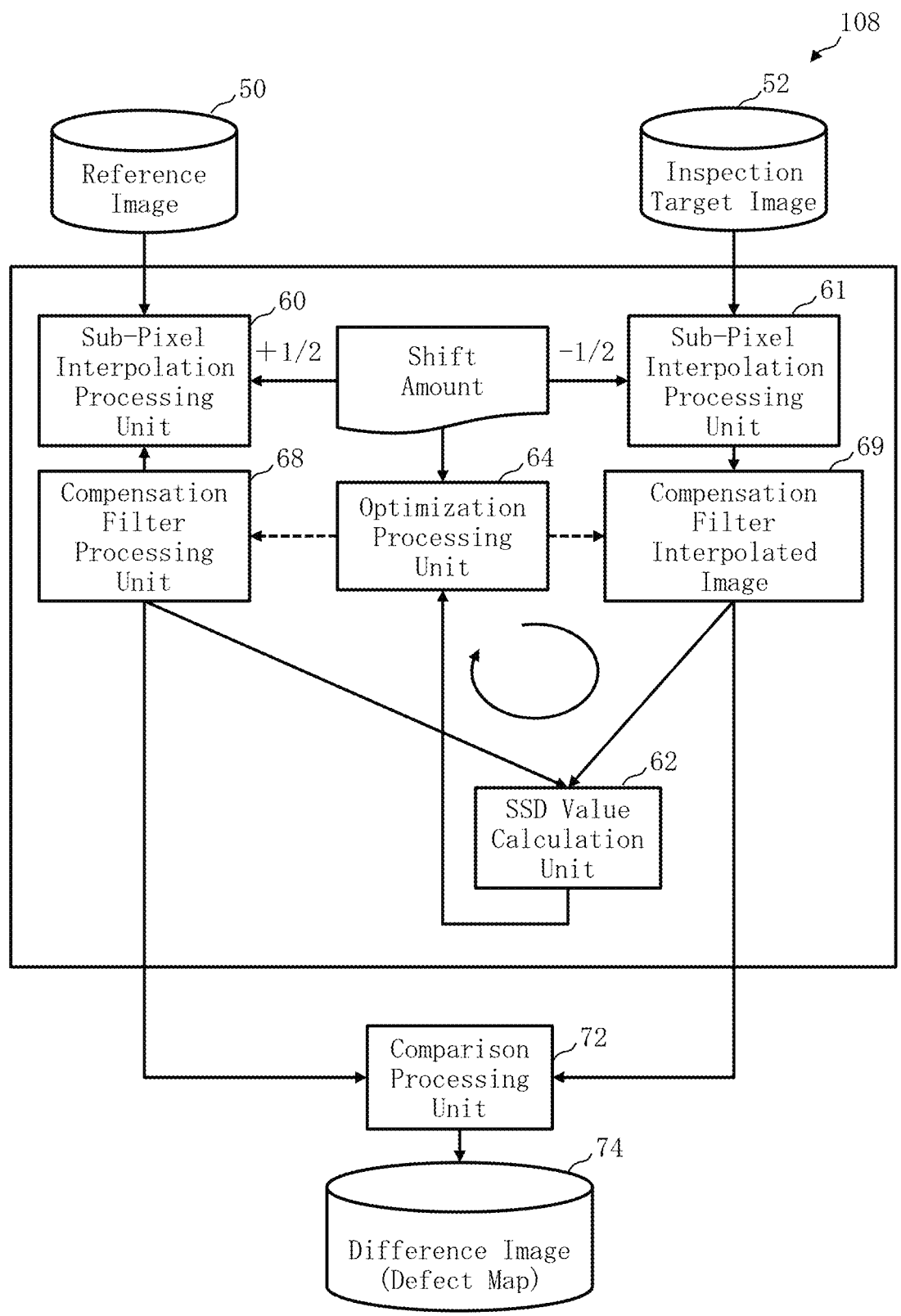
FIG. 14 is an example of an internal configuration diagram illustrating a configuration inside a comparison circuitry of Embodiment 3.

FIG. 14 is an example of an internal configuration diagram illustrating a configuration inside the comparison circuitry of Embodiment 3. In FIG. 14, the storage devices 50, 52, and 74 such as a magnetic disk drive, the alignment unit 58, and the comparison processing unit 72 are disposed inside the comparison circuitry 108. As an internal configuration, the sub-pixel interpolation processing units 60 and 61, the SSD (Sum of Squared Difference) value calculation unit 62, the optimization processing unit 64, and the compensation filter processing units 68 and 69 are arranged inside the alignment unit 58. The "units" such as the alignment unit 58 (the sub-pixel interpolation processing units 60 and 61, the SSD value calculation unit 62, the optimization processing unit 64, and the compensation filter processing units 68 and 69), and the comparison processing unit 72 include a processing circuitry and the processing circuitry include an electric circuitry, a computer, a processor, a circuitry substrate, a quantum circuitry, or a semiconductor device. Further, the "units" may use a common processing circuitry (the same processing circuitry). Alternatively, a different processing circuitry (another processing circuitry) may be used. Input data or calculation result necessary for the alignment unit 58 (the sub-pixel interpolation processing units 60 and 61, the SSD value calculation unit 62, the optimization processing unit 64, and the compensation filter processing units 68 and 69), and the comparison processing unit 72 is stored in a memory (not illustrated) at each time. In Embodiment 1, the compensation filter process is performed on the original image after optimizing the image shift amount for the alignment inside the alignment unit 58, but in Embodiment 2, the compensation filter process is performed on an image within a loop for optimizing the image shift amount for the alignment inside the alignment unit 58 as illustrated in FIG. 13.

In the measurement data transmitted to the comparison circuitry 108, an image (mask die image) of the mask die 33 to be the inspection target image is stored (memorized) in the storage device 52 (the first storage device). An image (mask die image) of the mask die 33 to be the reference image corresponding to the inspection target image is stored (memorized) in the storage device 50 (the second storage device).

The sub-pixel interpolation processing unit 60 (the first sub-pixel interpolation processing unit) calculates the pixel value of the reference image corresponding to the position of each pixel of the inspection target image before the shifting by performing the interpolation process using at least one pixel value of the reference image while variably and relatively shifting the inspection target image and the reference image by the unit of the sub-pixel so that both the inspection target image and the reference image are moved.

The sub-pixel interpolation processing unit 61 (the second sub-pixel interpolation processing unit) calculates the pixel value of the inspection target image corresponding to the position of each pixel of the reference image before the shifting by performing the interpolation process using at least one pixel value of the inspection target image while variably and relatively shifting the inspection target image and the reference image by the unit of the sub-pixel so that both the inspection target image and the reference image are moved.

In Embodiment 3, when the reference image and the inspection target image not subjected to the smoothing process are relatively shifted from each other, each of the inspection target image and the reference image is shifted by a half of the image shift amount. In order to form a desired image shift amount between both images by the shift of both images, the shifting direction is set to be opposite directions in the inspection target image and the reference image. As for the desired image shift amount x, the reference image is shifted by, for example, +x/2 and the inspection target image is shifted by, for example, −x/2.

As for the shifting by the unit of the sub-pixel, when one pixel is defined by, for example, 256 gradations, for example, it is preferable to shift 1/16 pixels or 1/8 pixels in the x and y directions. In the method of the interpolation process, as described with reference to FIG. 8A, when the reference image is shifted and the pixel value gx at the position of each pixel of the inspection target image before the shifting is obtained by the interpolation, an interpolation is performed by using the pixel values ($g_{-1}$, $g_0$, $g_1$, and $g_2$) of the peripheral pixels (−1, 0, 1, and 2) of totally four pixels including two pixels adjacent to each other at both sides in the shifting direction. In such a case, it is assumed that the target pixel is located between the peripheral pixel (0) and the peripheral pixel (1) and is shifted from the peripheral pixel (0) by the shift amount x/2. As illustrated in FIG. 8B, the pixel value gx of the target pixel in such a case can be defined by the linear sum using the pixel values of four peripheral pixels. Specifically, the pixel value can be defined by the above-described equation (3) (the interpolation filter function) indicating the sum of the values obtained by multiplying the weighting factors $q_{-1}$ to $q_2$ by the pixel values of four peripheral pixels.

In such a case, the weighting factor $q_{-1}$ to $q_2$ are defined by the function depending on the shift amount x/2. As illustrated in FIG. 8B, the weighting factors are defined so that the sum of the weighting factors $q_{-1}$ to $q_2$ becomes 1 and the sum of squares of the weighting factors $q_{-1}$ to $q_2$ becomes the function f(x/2) depending on the shift amount x/2 while x is replaced with x/2. The weighting factors $q_{-1}$ to $q_2$ may be a linear function of the shift amount x/2 or a second or higher order function.

Further, when an image is shifted in the one-dimensional direction (the y direction), the interpolation may be also performed on the shift amount y/2 in the same way. At the time of performing the filter process on the two-dimensional data, for example, the one-dimensional filter process is first performed in the x direction and the result is further subjected to the one-dimensional filter process in the y direction.

The same applies to a case of shifting the inspection target image and obtaining the pixel value gx at the position of each pixel of the reference image before the shifting by the interpolation. In such a case, there is no need to mention that the shift amount x/2 is the shift amount −x/2.

As described above, a variation of the level of the shot noise depending on the shift amount x corresponding to the shift amount +x/2 is included in each pixel value of the interpolated image of the reference image subjected to the interpolation process by the sub-pixel interpolation processing unit 60. Similarly, a variation of the level of the shot noise depending on the shift amount x corresponding to the shift amount −x/2 is included in each pixel value of the interpolated image of the inspection target image subjected to the interpolation process by the sub-pixel interpolation processing unit 61. Here, in Embodiment 3, the filter process is performed to eliminate a variation of the noise level depending on the shift amount x of each of the interpolated image of the reference image and the interpolated image of the inspection target image.

The compensation filter processing unit 68 (the filter processing unit) performs the filter process on the pixel value of the reference image (the interpolated image) subjected to the interpolation process every image shift amount by using the filter function of suppressing the influence of noise depending on the image shift amount. Specifically, as described with reference to FIG. 11A, when the pixel value g' in which a variation of the noise level depending on the shift amount x is eliminated is obtained for the pixel value of each pixel of the interpolated image (the reference image) subjected to the interpolation process, an interpolation is performed by using the pixel values ($g_{-1}$, $g_0$, $g_1$) of totally three pixels (−1, 0, 1) including the pixel subjected to the interpolation process and the pixels adjacent to both sides of the pixel in the shifting direction. In such a case, it is assumed that the target pixel is at the pixel (0). As illustrated in FIG. 11B, the pixel value g' of the target pixel in such a case can be defined by the linear sum using the pixel values of three pixels. Specifically, the pixel value can be defined by the above-described equation (3) (the compensation filter function) indicating the sum of two values obtained by multiplying the weighting factor $c_1$ by the pixel values of the peripheral pixels and the value obtained by multiplying the weighting factor $c_0$ by the pixel value.

In such a case, as illustrated in FIG. 11B, the weighting factors are defined so that the sum of the weighting factors $c_1$, $c_0$, and $c_1$ becomes 1 and the sum of squares of the weighting factors $c_1$, $c_0$, and $c_1$ becomes a value obtained by dividing the function f(x'/2) in which the noise level is minimized by the function f(x/2) depending on the shift amount x/2 while x is replaced with x/2. The weighting factors $c_0$ and $c_1$ may be linear functions of the shift amount x/2 or a second or higher order function. As described above, when 1/f(x/2) is multiplied by the function f(x'/2) in which the noise level is minimized, a variation of the noise level depending on the shift amount x/2 occurring when the interpolation process has performed already is eliminated. Accordingly, the interpolated image subjected to the compensation filter process can have the pixel value g' in a condition in which a variation of the noise level depending on the shift amount x/2 is eliminated.

Additionally, when an image is shifted in the one-dimensional direction (the y direction), an interpolation may be also performed on the shift amount y/2 in the same way. At the time of performing the filter process on the two-dimensional data, for example, the one-dimensional filter process is first performed in the x direction and the result is further subjected to the one-dimensional filter process in the y direction.

The compensation filter processing unit 69 (the filter processing unit) performs the filter process using the filter function of suppressing the influence of noise depending on the image shift amount on the pixel value of the inspection target image (the interpolated image) subjected to the interpolation process every image shift amount. A method of the compensation filter process is the same as that of the reference image except that the shifting direction is the opposite direction.

As described above, according to Embodiment 3, it is possible to generate the inspection target image (the interpolated image) and the reference image (the interpolated image) in which a variation of the noise level depending on the image shift amount is eliminated at the step before the SSD value is calculated. Further, according to Embodiment 3, since the reference image (the interpolated image) and the inspection target image (the interpolated image) complement each other, it is necessary to shift the reference image (the interpolated image) and the inspection target image (the interpolated image) by 1/4 pixels in order to minimize the noise level. Thus, as in Embodiments 1 and 2, it is possible to suppress a decrease in image sharpness compared to a case where the reference image (the interpolated image) is shifted by 1/2 pixels.

Next, the SSD value calculation unit 62 (the SSD calculation unit) calculates the sum of squared difference (SSD) of each pixel value of the inspection target image subjected to the compensation filter process after the interpolation process and the corresponding pixel value of the reference image subjected to the compensation filter process after the interpolation process every shift amount.

Next, the optimization processing unit 64 calculates the image shift amount in which the sum of squared difference (SSD) is minimized. For that reason, the optimization processing unit 64 variably shifts the image shift amount and outputs the image shift amount set at each time to the sub-pixel interpolation processing units 60 and 61. Then, the sub-pixel interpolation processing unit 60 interpolates the reference image with the image shift amount set as described above and the compensation filter processing unit 68 performs the compensation filter process. Similarly, the sub-pixel interpolation processing unit 61 interpolates the inspection target image with the image shift amount set as described above and the compensation filter processing unit 69 performs the compensation filter process. Then, the SSD value calculation unit 62 calculates the sum of squared difference (SSD) and outputs the calculation result to the optimization processing unit 64. As described above, the reference image (the compensation filter interpolated image) and the inspection target image (the compensation filter interpolated image) subjected to the interpolation process and the compensation filter process with the image shift amount in which the sum of squared difference (SSD) is minimized and which is calculated by the optimization processing unit 64 are output to the comparison processing unit 72.

As described above, in Embodiment 3, the reference image (the compensation filter interpolated image) in which a variation of the noise level depending on the image shift amount is eliminated by the interpolation using the compensation filter process and the inspection target image (the compensation filter interpolated image) in which a variation of the noise level depending on the image shift amount is eliminated by the interpolation using the compensation filter process are aligned to each other.

The comparison processing unit 72 (the comparison unit) compare the inspection target image and the reference image with each other while the inspection target image and the reference image are aligned to each other using the image shift amount in which the calculated sum of squared difference is minimized. As the comparison method, every pixel may be compared or a deviation between the contour lines of the figures may be compared. The comparison result may be output to the storage device 109, the monitor 117, or the memory 118 or may be output from the printer 119.

Additionally, in the above-described example, a case of performing the die to die inspection has been described, but the example is the same as Embodiment 1 in that the invention can be also applied to a case of performing the die to database inspection.

As described above, according to Embodiment 3, since a variation of the noise level depending on the image shift amount is eliminated by the compensation filter process, the noise level can be the same regardless of the shift amount obtained by the alignment. Then, the alignment can be performed in such a state. Further, since the reference image (the compensation filter interpolated image) and the inspection target image (the compensation filter interpolated image) in which a variation of the noise level depending on the image shift amount is eliminated are generated at the step of optimizing the alignment, the reference image (the compensation filter interpolated image) and the inspection target image (the compensation filter interpolated image) which are generated already can be used in the comparison process. Thus, a configuration inside the comparison circuitry 108 can be simplified compared to Embodiment 1. Further, according to Embodiment 3, since the shift amount to the minimum value of the noise level in the compensation filter process can be set to 1/4 pixels, it is possible to suppress a decrease in the sharpness of the image and thus to detect finer defects.

Additionally, in the above-described example, a case of shifting each of the inspection target image and the reference image by a half of the image shift amount is illustrated, but the invention is not limited thereto. A shifting ratio between the inspection target image and the reference image may not be 1:1. Although there is a possibility that the sharpness of the image may be degraded as compared with the case where the shifting ratio is 1:1, deterioration of the sharpness of the image can be suppressed as compared with the case of shifting only the inspection target image and the reference image.

As described above, according to Embodiment 3, it is possible to align images while reducing the influence of noise. For that reason, it is possible to perform a highly accurate pattern inspection.

In the description above, a series of "circuitries" include a processing circuitry and the processing circuitry includes an electric circuitry, a computer, a processor, a circuitry substrate, a quantum circuitry, or a semiconductor device. Further, the "circuitries" may use a common processing circuitry (the same processing circuitry).

Alternatively, a different processing circuitry (another processing circuitry) may be used. A program for executing the processor or the like may be stored in a record carrier body such as a magnetic disk drive, a magnetic tape device, an FD, or a ROM (Read Only Memory). For example, the position circuitry 107, the comparison circuitry 108, and the reference image generating circuitry 112 may be configured as at least one processing circuitry.

As described above, the embodiments have been described with reference to detailed examples. However, the invention is not limited to the detailed examples. In Embodiments 1 and 2, a case of shifting the reference image has been described, but the invention is not limited thereto. The invention can be also applied to a case of shifting the inspection target image. As for the shifting by the unit of the sub-pixel, when the shift amount is one pixel or more, for example, 3+5/16 pixels, three pixels may be shifted by the unit of the pixel and 5/16 pixels may be shifted by the unit of the sub-pixel according to the above-described method.

Further, descriptions of parts such as an apparatus configuration and a control method which are not directly necessary for the description of the invention are omitted, but an apparatus configuration and a control method which are necessary in the invention can be appropriately selected and used.

In addition, all of the pattern inspection apparatuses and the pattern inspection methods which include the elements of the invention and can be appropriately designed and changed by those skilled in the art are included in the scope of the invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
an image acquiring mechanism configured to acquire an inspection target image for a figure from a substrate provided with the figure by using an electron beam;
a first sub-pixel interpolation processing circuitry configured to calculate a pixel value of a reference image corresponding to a position of each pixel of the inspection target image by performing an interpolation process using at least one pixel value of the reference image for a shift amount while variably and relatively shifting the inspection target image and the reference image by a unit of a sub-pixel using the reference image corresponding to the inspection target image;
a filter processing circuitry configured to perform a filter process of eliminating a change of noise level that occurs depending on the shift amount of the unit of the sub-pixel used in the interpolation process, on the pixel value of the reference image subjected to the interpolation process by using a filter function of suppressing an influence of noise depending on the shift amount of the unit of the sub-pixel, for the shift amount;
an SSD calculation processing circuitry configured to calculate a sum of squared difference between each pixel value of the inspection target image and a corresponding pixel value of the reference image subjected to the filter process for the shift amount; and
a comparison processing circuitry configured to compare the inspection target image with the reference image while the inspection target image is aligned to the reference image by using the shift amount in which the calculated sum of squared difference is minimized.

2. The apparatus according to claim 1,
wherein the inspection target image and the reference image are shifted by a half of the shift amount at the time of relatively shifting the inspection target image and the reference image from each other for the shift amount.

3. The apparatus according to claim 2, further comprising:
a second sub-pixel interpolation processing circuitry configured to calculate a pixel value of the inspection target image corresponding to a position of each pixel of the reference image by performing an interpolation process using at least one pixel value of the inspection target image while shifting the inspection target image by the half of the shift amount.

4. The apparatus according to claim 1,
wherein the filter function is set to eliminate a variation of a noise level caused by the interpolation process for the reference image.

5. The apparatus according to claim 1, further comprising:
a smoothing processing circuitry configured to perform a smoothing process of smoothing a pattern end on the figure in the inspection target image.

6. The apparatus according to claim 1, wherein in the interpolation process, for any of the each pixel, a sum of values obtained by multiplying pixel values of four peripheral pixels by a different one of four weighting factors $q_{-1}$ to $q_2$ respectively is calculated, the four weighting factors $q_{-1}$ to $q_2$ defined so that a sum of the four weighting factors $q_{-1}$ to $q_2$ becomes 1 and a sum of squares of the four weighting factors $q_{-1}$ to $q_2$ becomes the filter function $f(x)$ depending on a shift amount x of the shift amount, the four peripheral pixels including two adjacent pixels at each of both sides in the direction of shifting at each pixel position of the inspection target image.

7. The apparatus according to claim 1, wherein in the filter process, for any of the each pixel, a sum of two values obtained by multiplying a same weighting factor $c_1$ by pixel values of two peripheral pixels $g_{-1}$ and $g_1$ of a target pixel $g_0$ of any one pixel of the inspection target image, in which the interpolation process is performed, and a value obtained by multiplying a weighting factor $c_0$ by a pixel value of the target pixel $g_0$ is calculated, a sum of the weighting factors $c_1$, $c_0$, and $c_1$ becomes 1 and a sum of squares of the weighting factors $c_1$, $c_0$, and $c_1$ is defined as a value obtained by dividing a function $f(x')$ in which the noise level is minimized by the filter function $f(x)$ depending on a shift amount x of the each shift amount.

8. A pattern inspection apparatus comprising:
an image acquiring mechanism configured to acquire an inspection target image of a figure from a substrate provided with the figure by using an electron beam;
a first storage device configured to store the inspection target image;
a second storage device configured to store a reference image corresponding to the inspection target image;
a first smoothing processing circuitry configured to perform a first smoothing process of smoothing a pattern end on the figure in the inspection target image;
a second smoothing processing circuitry configured to perform a second smoothing process of smoothing a pattern end on the figure in the reference image;
a first sub-pixel interpolation processing circuitry configured to calculate a pixel value of the reference image corresponding to a position of each pixel of the inspection target image by performing an interpolation process using at least one pixel value of the reference image subjected to the second smoothing process for a shift amount while variably and relatively shifting the inspection target image subjected to the first smoothing process and the reference image subjected to the second smoothing process by a unit of a sub-pixel;
an SSD calculation processing circuitry configured to calculate a sum of squared difference between each pixel value of the inspection target image and a corresponding pixel value of the reference image subjected to the interpolation process for the shift amount;
a second sub-pixel interpolation processing circuitry configured to calculate a pixel value of the reference image corresponding to a position of each pixel of the inspection target image by reading the reference image not subjected to the second smoothing process from the second storage device and performing an interpolation process with the shift amount in which the sum of squared difference is minimized using at least one pixel value of the reference image not subjected to the second smoothing process; and a comparison processing circuitry configured to compare the inspection target image with the reference image subjected to the interpolation process with the shift amount in which the sum of squared difference is minimized while the second smoothing process is performed thereon.

9. The apparatus according to claim 8, further comprising:
a filter processing circuitry configured to perform a filter process using a filter function of suppressing an influence of noise depending on the shift amount on the reference image subjected to the interpolation process with the shift amount in which the sum of squared difference is minimized.

10. The apparatus according to claim 8, further comprising:
a third smoothing processing circuitry configured to perform a third smoothing process weaker than the first smoothing process of smoothing the pattern end on the figure inside the inspection target image.

11. A pattern inspection method comprising:
acquiring an inspection target image for a figure from a substrate provided with the figure by using an electron beam;
calculating a pixel value of a reference image corresponding to a position of each pixel of the inspection target image by performing an interpolation process using at least one pixel value of the reference image for a shift amount while variably and relatively shifting the inspection target image and the reference image by a unit of a sub-pixel using the reference image corresponding to the inspection target image;
performing a filter process of eliminating a change of noise level that occurs depending on the shift amount of the unit of the sub-pixel used in the interpolation process, on the pixel value of the reference image subjected to the interpolation process by using a filter function of suppressing an influence of noise depending on the shift amount of the unit of the sub-pixel;
calculating a sum of squared difference between each pixel value of the inspection target image and a corresponding pixel value of the reference image subjected to the filter process for the shift amount; and
comparing the inspection target image with the reference image while the inspection target image is aligned to the reference image by using a shift amount of the shift amount in which the calculated sum of squared difference is minimized and outputting the result.

12. A pattern inspection method comprising:
acquiring an inspection target image of a figure from a substrate provided with the figure by using an electron beam;
performing a first smoothing process of smoothing a pattern end on the figure inside the inspection target image by reading the inspection target image from a first storage device storing the inspection target image;
performing a second smoothing process of smoothing a pattern end on a figure of a reference image by reading the reference image from a second storage device storing the reference image corresponding to the inspection target image;
calculating a pixel value of the reference image corresponding to a position of each pixel of the inspection target image by performing an interpolation process using at least one pixel value of the reference image subjected to the second smoothing process for a shift amount while variably and relatively shifting the reference image subjected to the second smoothing process and the inspection target image subjected to the first smoothing process by a unit of a sub-pixel for the shift amount;
calculating a sum of squared difference between each pixel value of the inspection target image and a corresponding pixel value of the reference image subjected to the interpolation process for the shift amount;
calculating a pixel value of the reference image corresponding to a position of each pixel of the inspection target image by reading the reference image not subjected to the second smoothing process from the second storage device and performing an interpolation process with the shift amount in which the sum of squared difference is minimized using at least one pixel value of the reference image not subjected to the second smoothing process; and
comparing the inspection target image with the reference image subjected to the interpolation process with the shift amount in which the sum of squared difference is minimized while the second smoothing process is performed thereon and outputting the result.

\* \* \* \* \*